US012166921B2

(12) United States Patent
Steinbrenner et al.

(10) Patent No.: US 12,166,921 B2
(45) Date of Patent: Dec. 10, 2024

(54) DEVICE, SYSTEM, AND METHOD TO INITIATE ELECTRONIC ACTIONS ON CALLS AND MANAGE CALL-TAKING RESOURCES

(71) Applicant: MOTOROLA SOLUTIONS, INC., Chicago, IL (US)

(72) Inventors: Anna L. Steinbrenner, Bartlett, IL (US); Jody A. Stowell, Lake in the Hills, IL (US); Shilpa Varanasi, Hoffman Estates, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 216 days.

(21) Appl. No.: 18/090,151

(22) Filed: Dec. 28, 2022

(65) Prior Publication Data

US 2024/0223705 A1 Jul. 4, 2024

(51) Int. Cl.
*H04M 11/04* (2006.01)
*G10L 25/63* (2013.01)
*H04M 3/22* (2006.01)
*H04M 3/51* (2006.01)

(52) U.S. Cl.
CPC ........... *H04M 3/5116* (2013.01); *G10L 25/63* (2013.01); *H04M 3/2281* (2013.01); *H04M 2242/04* (2013.01)

(58) Field of Classification Search
CPC .... H04M 3/5116; H04M 3/2281; G10L 25/63
See application file for complete search history.

(56) References Cited

U.S. PATENT DOCUMENTS

| | | | |
|---|---|---|---|
| 6,400,804 | B1 | 6/2002 | Bilder |
| 10,306,059 | B1 * | 5/2019 | Bondareva ............ H04L 51/214 |
| 11,218,584 | B2 | 1/2022 | Martin et al. |
| 2019/0385711 | A1 * | 12/2019 | Shriberg ................ G09B 19/00 |
| 2020/0126174 | A1 * | 4/2020 | Halse ................... G06Q 50/265 |
| 2021/0110895 | A1 * | 4/2021 | Shriberg ................ G06F 40/20 |
| 2022/0086393 | A1 * | 3/2022 | Peters .................... H04N 7/147 |

* cited by examiner

*Primary Examiner* — Simon King
(74) *Attorney, Agent, or Firm* — PERRY + CURRIER, INC.

(57) ABSTRACT

Device, system and method to initiate electronic actions on calls and manage call-taking resources is provided. A device receives a call for a public-safety answering point (PSAP) and, based on determining human-operated communication devices of the PSAP are engaged on other calls: places the call into a queue; answers the call; and provides, on the call, an inquiry for keywords indicative of mental health of a caller on the call. The device determines, based on a keyword spoken by the caller, an electronic activity configured to maintain the caller on the call, including a prompt to cause the caller to talk. The device provides, while the call is in the queue, the electronic activity on the call, receives a response, and, based on a relative reduction of the queue, the keyword, the response, and/or a measured stress level of the caller, implements an electronic action configured to manage the queue.

20 Claims, 10 Drawing Sheets

DEVICE, SYSTEM, AND METHOD TO INITIATE ELECTRONIC ACTIONS ON CALLS AND MANAGE CALL-TAKING RESOURCES

BACKGROUND OF THE INVENTION

In public-safety environments, call-taking resources may be overwhelmed such that calls received at public-safety answering points may not be answered immediately, but rather placed into a queue to be answered. While the queue may be reduced when calls end prior to being answered, such ending of calls is generally a waste of processing resources and/or bandwidth to maintain the queue for such calls prior to their ending.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
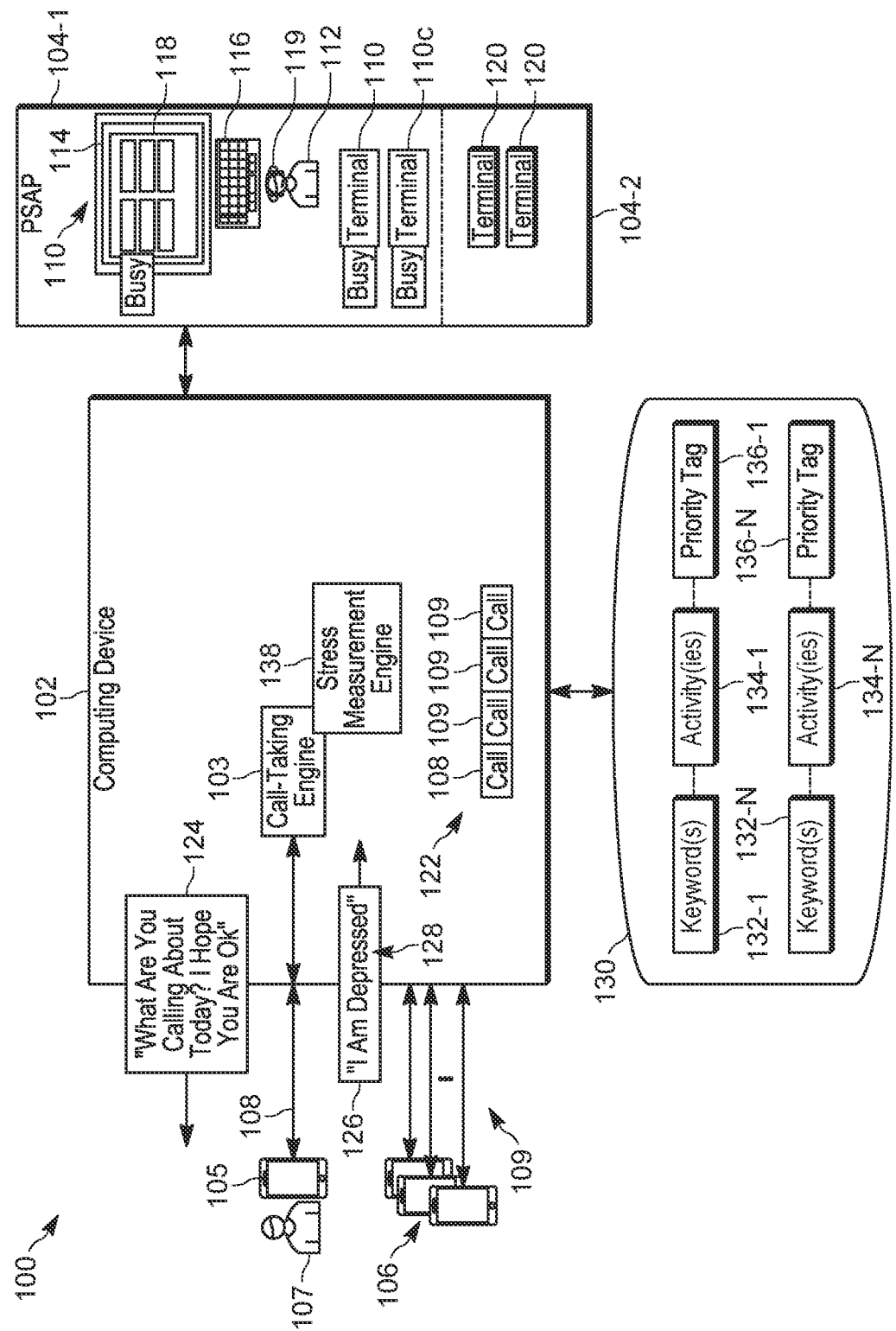
FIG. 1 is a system to initiate electronic actions on calls and manage call-taking resources, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In public-safety environments, call-taking resources may be overwhelmed such that calls received at public-safety answering points may not be answered immediately, but rather placed into a call queue (e.g., hereinafter a queue) to be answered. While the queue may be reduced when calls end prior to being answered, such ending of calls is generally a waste of processing resources and/or bandwidth to maintain the queue for such calls prior to their ending. Furthermore, when such calls are in the queue, other calls may not be answered such that callers receive a busy-signal, which may exacerbate a situation for the caller, such as those related to mental health, which may lead to a decrease in quality of life for the caller. Thus, there exists a need for an improved technical method, device, and system to initiate electronic actions on calls and manage call-taking resources.

Hence, provided herein is a device, system and method to initiate electronic actions on calls and manage call-taking resources, such as a call queue. A system is provided that includes a computing device that implements a call-taking engine; the computing device and/or the call-taking engine receives calls as a proxy for a public-safety answering point (PSAP). In particular, calls are received via a mental-health related number associated with the PSAP. For example, a PSAP may be configured to receive calls on various numbers, such as mental-health related numbers (e.g., "988" calls) and public-safety numbers (e.g., "911" calls). Alternatively, different respective PSAPs may be dedicated to mental-health related numbers (e.g., "988" calls) and public-safety numbers (e.g., "911" calls), respectively. Regardless, call-handling and protocols for the different numbers generally differs due to the nature of the calls. For example, calls to mental-health related numbers may be subject to more stringent privacy protocols than calls to public-safety numbers. In particular, due to privacy, for calls to mental-health related numbers, phone numbers of calls are not stored and/or may not be determined; whereas for calls to public-safety numbers, phone numbers of calls may be determined and stored.

Furthermore, at a PSAP configured to receive calls on both mental-health related numbers and public-safety numbers, the calls may be directed to different human-operated communication devices and/or PSAP terminals dedicated to calls from the different numbers. For example, one set of human-operated communication devices/PSAP terminals may be dedicated to receiving calls to a mental-health related number, while another one of human-operated communication devices/PSAP terminals may be dedicated to receiving calls to a public-safety related number. Furthermore, the calls to the mental-health related number and the calls to the public-safety related number may be placed in different queues, for example when no respective human-operated communication devices/PSAP terminals are available to immediately take the calls.

Placing calls into queues requires processing resources and bandwidth at the provided computing device, which can be a waste of such processing resources and bandwidth when calls placed into the queue end before being transferred to a human-operated communication device/PSAP terminal. For example, any processing resources and bandwidth used to maintain a call in a queue is wasted when the call is not later transferred to a human-operated communication device/PSAP terminal.

Calls in queues ending prior to being transferred to a human-operated communication device/PSAP terminal may be a particular problem with calls to mental-health related numbers, as callers to such mental-health related numbers may be more inclined to end the calls if they don't speak to a human operator within a given time period. Furthermore, such ending of calls may lead to a decrease in quality of life for the callers.

Similarly, when such calls that later end are in a queue, and the queue is full, other calls to a mental-health related number may be rejected, which is a waste of bandwidth used by the other calls, and which may also lead to a decrease in quality of life for the callers placing the other calls.

Hence, the call-taking engine provided herein is generally configured to answer a call that is otherwise placed into a queue, and provide, on the call, an inquiry for keywords indicative of mental health of a caller on the call. For example, using text-to-voice functionality, and the like, the call-taking engine may provide an inquiry, which may include a question, such as "What are you calling about today? I hope you are OK", and a response on the call may include keywords, and in particular mental-health related keywords, such as "depressed", "anxiety" and the like, amongst other possibilities.

The call-taking engine, based on the keywords, may determine an electronic activity configured to maintain the caller on the call, for example to maintain the call in the queue, until the call is answered by a human-operated communication device/PSAP terminal. Such activities may further be configured to reduce stress levels of the caller. Such an electronic activity may be provided on the call by the call-taking engine, and generally includes a prompt and/or prompts, including, but not limited to questions, to cause the caller to talk on the call, and the call-taking engine may receive a response and/or responses.

Based on one or more of a relative reduction of the queue (e.g., other calls ahead of the call in the queue may leave the queue due to being answered by human-operated communication devices and/or the other calls may end), the keyword, the response, and a measured stress level of the caller, the call-taking engine may implement an electronic action configured to manage the queue. For example, the call-taking engine may escalate the call in the queue to place the call closer to the front of the queue such that a human-operated communication device/PSAP terminal answers the call sooner. Alternatively, the call may be transferred out of the queue to a human-operated communication device/PSAP terminal that is assigned to handle higher priority calls. Such electronic actions may further reduce the queue, making more electronic resources available to handle further calls being received at the computing device.

An aspect of the present specification provides a method comprising: receiving, via a computing device, a call, the computing device configured to receive calls as a proxy for a public-safety answering point, the call received via a mental-health related number for the public-safety answering point; based on determining, via the computing device, that human-operated communication devices of the public-safety answering point are engaged on other calls; placing the call into a queue for answering by a human-operated communication device of the public-safety answering point; answering, via the computing device, the call; and providing, via the computing device, on the call, an inquiry for keywords indicative of mental health of a caller on the call; determining, via the computing device, based on a keyword spoken by the caller on the call, an electronic activity configured to maintain the caller on the call and reduce stress levels of the caller, the electronic activity including a prompt to cause the caller to talk on the call; providing, via the computing device, while the call is in the queue, the electronic activity on the call; receiving, via the computing device, a response by the caller on the call; and based on one or more of a relative reduction of the queue, the keyword, the response, and a measured stress level of the caller, implementing, via the computing device, an electronic action configured to manage the queue.

Another aspect of the present specification provides a device comprising: a communication interface; and a controller configured to: receive, via the communication interface, a call, the controller configured to receive calls as a proxy for a public-safety answering point, the call received via a mental-health related number for the public-safety answering point; based on determining that human-operated communication devices of the public-safety answering point are engaged on other calls: place the call into a queue for answering by a human-operated communication device of the public-safety answering point; answer the call; and provide, on the call, an inquiry for keywords indicative of mental health of a caller on the call; determine, based on a keyword spoken by the caller on the call, an electronic activity configured to maintain the caller on the call and reduce stress levels of the caller, the electronic activity including a prompt to cause the caller to talk on the call; provide, while the call is in the queue, the electronic activity on the call; receive, via the communication interface, a response by the caller on the call; and based on one or more of a relative reduction of the queue, the keyword, the response, and a measured stress level of the caller, implement an electronic action configured to manage the queue.

Each of the above-mentioned aspects will be discussed in more detail below, starting with example system and device architectures of the system, in which the embodiments may be practiced, followed by an illustration of processing blocks for achieving an improved technical method, device, and system to initiate electronic actions on calls and manage call-taking resources.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, the term "engine", such as a call-taking engine, is understood to refer to hardware, and/or a combination of hardware and software (e.g., a combination of hardware and software includes software hosted at hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 to initiate electronic actions on calls and manage call-taking resources. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a computing device 102, implementing a call-taking engine 103, which may generally be configured as a proxy device for depicted PSAPs 104-1, 104-2, which may provide services for a common jurisdiction as described herein. For example, the PSAP 104-1 being dedicated to answering calls to a mental-health related number (e.g., such as "988" and the like) for the common jurisdiction, and the PSAP 104-2 being dedicated to answering calls to a public-safety related number (e.g., such as "911" and the like) for the common jurisdiction.

It is understood that the PSAPs 104-1, 104-2 may be separate PSAPS or may be combined into one PSAP. As depicted, it is understood that the PSAPs 104-1, 104-2 are combined and hence will be interchangeably referred to hereafter as the PSAP 104, with the different functionality of each portion of the PSAP 104 indicated in FIG. 1 via a broken line between the PSAP 104-1 and the PSAP 104-2.

While only one (e.g., combined) PSAP 104 is depicted, the computing device 102 and/or the call-taking engine 103 may be configured as a proxy device for a plurality of PSAPs, for example for different jurisdictions.

The computing device 102 may comprise any suitable combination of one or more servers, one or more cloud computing devices, one or more proxy devices, and the like. For example, the computing device 102 and/or the call-taking engine 103 may act as a proxy for the PSAP 104, for example to convey communications between the PSAP 104 and communication devices 105, 106.

For example, as depicted, the communication device 105 has been operated by a caller 107 to place a call 108 to the PSAP 104-1 using a mental-health related number. While callers associated with the communication devices 106 (e.g., a plurality of communication devices 106) are not depicted, it is understood that the communication devices 106 have also been operated by callers to place respective calls 109 to the PSAP 104-1 using a mental-health related number. While a certain number of communication devices 106 and calls 109 are depicted (e.g., three), it is understood that the system 100 may comprise any suitable number of communication devices 106 and calls 109. It is understood that the calls 108, 109 may be received, on behalf of the PSAP 104-1, by the computing device 102, and that at least a portion of the calls 109 have been directed to human-operated communication devices 110 of the PSAP 104-1.

As depicted, the PSAP 104-1 may include any suitable number of human-operated communication devices 110, which may be in the form of PSAP terminals and the like. While only three human-operated communication devices 110 are depicted, the PSAP 104-1 may include any suitable number of the human-operated communication devices 110. Furthermore, a number of the human-operated communication devices 110 may change over time, for example, as operators of the human-operated communication devices 110 go on and off shifts, and the like.

Furthermore, as depicted, a particular human-operated communication device 110*c* may be dedicated to critical priority calls, for example as determined by the call-taking engine 103, as described in more detail below.

Details of one human-operated communication device 110 are depicted. In particular, a human-operated communication device 110 may be operated by an operator 112, and the human-operated communication device 110 may comprise a display screen 114 and an input device 116 (e.g., as such a keyboard, as depicted, a pointing device and/or any other suitable input device). However, the display screen 114 and the input device 116 may be provided in any suitable format (e.g., different from a PSAP terminal), such as a laptop, a personal computer, and the like (e.g., when the operator 112 is working from home and/or "off-premises" from the PSAP 104-1). In general, the display screen 114 and the input device 116 may be used to interact with the human-operated communication device 110, for example via an interface 118 provided at the display screen 114, and the like. The human-operated communication device 110 further comprises a communication device, for example as represented in FIG. 1 by a headset 119 worn by the operator 112.

While operators 112 are not depicted as operating each of the human-operated communication devices 110, 110*c*, it is understood that they are nonetheless present.

As depicted, the PSAP 104-2 also comprises human-operated communication devices 120, which may be similar to the human-operated communication devices 110, but configured to receive calls from a public-safety related number. While two human-operated communication devices 120 are depicted, like the PSAP 104-1, the PSAP 104-2 may comprise any suitable number of human-operated communication devices 120. Furthermore, while details and/or operators of the human-operated communication devices 120 are not depicted, details of the human-operated communication devices 120 may be similar to the human-operated communication devices 110 and further operators of the human-operated communication devices 120 are understood to be present.

As depicted, it is understood that all of the human-operated communication devices 110 are engaged in calls 109, for example from the communication devices 106, and the like; as such, all the human-operated communication devices 110 of the PSAP 104-1 are indicated as being "Busy". However, it is further understood that there are more calls 109 being received at the PSAP 104-1 and/or the computing device 102 than there are human-operated communication devices 110. As such, a portion of the calls 109 have been placed into a call queue 122 (e.g., herein after the queue 122) where the calls 109 are handled by the computing device 102 until a human-operated communication device 110 becomes available to take a first and/or next call 109 in the queue 122. For example, when a call 109 that is being handled by a human-operated communication device 110 ends, the first call 109 in the queue 122 may be transferred to that human-operated communication device 110, which may reduce the queue 122 by one call 109. However, conversely, when a new call 108, 109 is received at the computing device 102, and no human-operated communication devices 110 are available, that call 108, 109 is placed at the end of the queue 122. As depicted, it is assumed there are three calls 109 in the queue 122 and that the call 108 has been received after the three calls 109; as such, the call 108 has been added to the end of the queue 122.

The computing device 102 generally uses significant processing resources and bandwidth to maintain the queue 122. Hence, when a call 108, 109 drops out of the queue 122 before being transferred to a human-operated communication device 110, such processing resources and bandwidth are generally wasted. Put another way, maintaining calls 108, 109 in the queue 122 until being transferred to a human-operated communication device 110 generally leads to more efficient operations by the computing device 102. Hence, the call-taking engine 103 is provided with functionality, as described herein, to maintain the calls 108, 109 in the queue 122.

While hereafter the functionality of the call-taking engine 103 is described with respect to the call 108 in the queue 122, it is understood that such functionality may occur with respect to any and/or all of the calls 108, 109 in the queue 122.

For example, as depicted, the call 108 may be received at the computing device 102, and placed into the queue 122 when human-operated communication devices 110 are unavailable to answer the call 108. However, the call-taking engine 103 answers the call 108 to attempt to maintain the caller 107 on the call 108, and the call 108 is simultaneously maintained in the queue 122, moving up in the queue as calls 109 ahead of the call 108 are answered by human-operated communication devices 110 and/or calls 109 end via respective callers hanging up using respective communication devices 106.

It is understood that the call-taking engine 103 may comprise and/or have access to, text-to-voice functionality and/or voice-to-text functionality. For example text-to-voice functionality may be used to convert text to voice to provide inquiries and/or prompts and/or electronic activities on the calls 108, 109. Similarly, voice-to-text functionality may be used to convert voice responses from callers on the calls 108, 109 to text.

For example, the call-taking engine 103 may provide, on the call 108, an inquiry 124, which may include, but is not limited to, a question, for keywords indicative of mental health of the caller 107 on the call 108. The inquiry 124 may specifically be directed towards inquiring about the mental health of the caller 107 as the call 108 is understood to have been received using a mental-health related number, however the inquiry 124 may simply inquire about reasons for the call 108. For example, as depicted, the inquiry 124 may include a prompt such as "What are you calling about today?" and a more specific statement of concern about the caller 107, such as "I hope you are OK". A response 126 on the call 108 by the caller 107 may include keywords, and in particular mental-health related keywords, such as "depressed", "anxiety" and the like, amongst other possibilities. For example, as depicted, the response 126 includes "I am depressed" which includes a keyword 128 of "depressed".

As depicted, the computing device 102 and/or the call-taking engine 103 has access to a memory 130, for example provided in the form of a database, which stores sets of keywords 132-1 . . . 132-N in association with respective sets of electronic activities 134-1 . . . 134-N, and optionally in further association with priority tags 136-1 . . . 136-N. For simplicity, the sets of keywords 132-1 . . . 132-N are interchangeably referred to hereafter, collectively, the keywords 132 and generically as a keyword 132 and/or a set of keywords 132. This convention will be used through the present specification. Hence, for example, sets of electronic activities 134-1 . . . 134-N are interchangeably referred to hereafter, collectively, the activities 134 and generically as an activity 134 and/or a set of activities 134. Similarly, the priority tags 136-1 . . . 136-N are interchangeably referred to hereafter, collectively, the priority tags 136 and generically as a priority tag 136.

Furthermore, associations between a set of keywords 132, a set of activities 134 and a priority tag 136 are indicated at the memory 130 via dashed lines therebetween.

It is further understood that there are "N" associated sets of keywords 132, activities 134 and priority tags 136, where "N" is any suitable number of sets of keywords 132, which may be added to over time, and/or reduced. "N" may be in the tens or hundreds, amongst other possibilities, and/or may correspond to a number of types of mental-health related keywords, and/or groups thereof, that the call-taking engine 103 is configured to identify.

Associated keywords 132, activities 134 and priority tags 136 may be determined heuristically and/or via machine learning techniques, and the like. Regardless, it is understood that the associated keywords 132, activities 134 and priority tags 136 may be preconfigured at the memory 130.

Alternatively, and/or in addition, it is understood that the call-taking engine 103 may comprise a machine learning engine and/or algorithm which has been trained to recognize keywords 132 in calls 108, 109 and determine activities 134, and optionally, priority tags 136 therefrom, for example using the associated sets of keywords 132, activities 134 and priority tags 136 as training data. For example, when such a machine learning engine and/or algorithm comprises a neural network, one layer of the neural network may receive responses (e.g., converted to text) from a caller as input, and output an activity, and another layer may receive the responses as input and output a priority tag.

A set of keywords 132 may include any suitable set of one or more keywords which may be associated with the same activities 134 and priority tag 136. For example, a keyword 132-1 may comprise the word "depressed" and/or a set of keywords 132-1 may comprise the related words "depressed", "depression", "devastated", "bi-polar depression", and the like.

However, other sets of keywords 132 may include words such as "murder" "suicide", "self-harm", "abused", "anxiety", "sad", and the like, suitably grouped together in the sets of keywords 132, or provided separately as a set of keywords 132 (e.g., one set of keywords 132 may comprise "suicide" and "taking my life", another set of keywords 132 may comprise "self-harm" and "cutting" etc.). While such examples of keywords 132 are directed to one word, the keywords 132 may include phrases, and the like, such as "I am feeling depressed", and the like.

An associated set of activities 134 may comprise one activity or more than one activity that may be implemented by the call-taking engine 103 on the calls 108, 109.

In general, an activity 134 may comprise text and/or a set of instructions and/or a set of programming instructions that enable the call-taking engine 103 (e.g., using text-to-voice functionality) to provide the activity 134 on a call.

In particular, an activity 134 includes a prompt and/or prompts to cause the caller 107 to talk on the call 108 for example to maintain the caller 107 on the call 108. Such prompt and/or prompts may include, but are not limited to, a question and/or questions. Furthermore, an activity 134 may be generally structured to reduce stress levels of the caller 107 on the call 108.

For example, an activity 134 may comprise an activity derived from the 5-4-3-2-1 technique in which people (e.g., callers) having mental health issues are asked to name, in order, 5 things they see, 4 things they can touch, 3 things they can hear, 2 things they can smell and 1 thing they can taste. Another activity 134 may comprise asking a caller to solve a series of basic math problems (e.g., "What does 1+1 equal?", "What does 2+2 equal?", and the like). Another activity 134 may comprise asking a caller to recite the alphabet (e.g., in whichever language is being used on call 108, 109), forwards or backwards. Another activity 134 may comprise asking a caller to engage in, and/or leading a caller through, breathing exercises (e.g., "Can you breathe in for 5 seconds and breathe out for 5 seconds?" and/or "Please breathe in for 5 seconds and breathe out for 5 second). Another activity 134 may comprise asking a caller to engage in, and/or leading a caller through, muscle relaxation exercises and/or progressive muscle relaxation exercises (e.g., "Can you stretch out your legs" and/or "Please stretch out your legs, "Can you roll your neck" and/or "Please roll your neck", amongst other possibilities).

Indeed, any suitable activity 134 is within the scope of the present specification including, but not limited to, a game of "I-Spy" (e.g., using generic prompts and/or questions directed at a caller as the call-taking engine 103 can't "see" what a caller sees, such as "Do you see something blue?"), asking a caller to clean something (e.g., Can you clean a counter in front of you? How about a plate"), asking a caller to make food and/or drink ("Can you make some toast or a tea"), asking a caller to find something (e.g., as in a scavenger hunt, such as "Can you find something blue"), etc. Such a list of activities 134 is not meant to be exhaustive, however.

Furthermore, a set of activities 134 may include one activity 134 or more than one activity 134 which may be ordered with respect to a heuristic determination of how the activities reduce stress in callers. For example, the set of activities 134-1 associated with a keyword 132-1 of "depressed" may include, in order, asking "54321" questions, asking math problems, asking to recite the alphabet and asking to make food. In particular, the initial activity 134 of asking "54321" questions may be to reduce stress of callers the most relative to the next activity 134 of asking math problems; hence, a given activity 134 may be to reduce stress of callers more than a next activity 134.

Furthermore, a set of activities 134 is understood to depend on an associated set of keywords 132. For example, in contrast to a set of activities 134-1 associated with a keyword 132-1 of "depressed", a set of keywords 132 that include "self-harm" may be associated with a set of activities 134 that include, in order, asking "54321" questions, asking to perform breathing exercises, asking to perform muscle relaxation exercises, asking to recite the alphabet and asking to make food.

The priority tags 136, when present, may include any suitable indicator of a priority of associated keywords 132, which may be determined heuristically and/or via machine learning techniques. For example, the priority tags 136 may be indicative of risk to a mental health of a caller indicated by associated keywords 132. For example, a priority tag 136 may indicate that such risk is "critical", "high", "medium" or "low", and/or a priority tag 136 may indicate risk using a scale of 1 to 4, where "1" indicates "critical" risk and "4" indicates "low" risk. However, any suitable priority tag 136 is within the scope of the present specification; similarly, any suitable scale is within the scope of the present specification including, but not limited to, a scale of 4 to 1, where "4" indicates "critical" risk and "1" indicates "low" risk, and/or a scale of 0 to 100 (e.g., where "0" indicates "critical" risk and "100" indicates "low" risk) and/or a scale of 100 to 0 (e.g., where "100" indicates "critical" risk and "0" indicates "low" risk), amongst other possibilities.

The call-taking engine 103 may identify a keyword 128 in the response 126 and, using a database lookup, and the like, identify the keyword 128 in the sets of keywords 132, and hence identify an associated set of activities 134, and an associated priority tag 136. Using the above example, when the keyword 128 identified on the call 108 is "depressed", an associated set of activities 134 may include, in order, asking "54321" questions, asking math problems, asking to recite the alphabet and asking to make food; furthermore, an associated priority tag 136 may comprise "medium", and the like.

As such, the call-taking engine 103 may initially provide, on the call 108, a first activity 134, of the associated set of activities 134, of asking "54321" questions and collect responses from the caller 107 on the call 108. When asking "54321" questions is complete, the call-taking engine 103 may then provide, on the call 108, a second activity 134, of the associated set of activities 134, of asking math problems and collect responses from the caller 107 on the call 108. The call-taking engine 103 may continue to provide the associated set of activities 134, in order, until the call 108 has moved to the front of the queue 122 (e.g., calls 109 in front of the call 108 are answered by human-operated communication devices 110 and/or calls 109 in front of the call 108 end due to callers ending respective calls 109).

It is understood, however, that as few as one activity 134 may be provided on the call 108 and/or when the call-taking engine 103 reaches an end of the activities 134 the call-taking engine 103 may again provide the first activity 134 and/or continue to provide the last activity 134. As such, the activities 134 may be structured to keep the caller 107 on the call 108 for up to a given time period, such as 15 minutes, 30 minutes, 45 minutes, amongst other possibilities, and the given time period may comprise an average historical maximum for which calls 108, 109 are held in the queue 122.

When the call 108 has moved to the front of the queue 122, and a human-operated communication device 110 becomes available to take the call 108, the call 108 may be moved out of the queue 122 and transferred to the available human-operated communication device 110.

Such a transfer is one example of an electronic action that may occur, based on a relative reduction of the queue 122 (e.g., relative to the call 108) to manage the queue 122 and/or to manage the mental health of the caller 107. Put another way, once the queue 122 reduces, relative to the call 108, such that the call 108 is at the front of the queue 122 (e.g., regardless of numbers of other calls 109 that may be behind the call 108 in the queue), the call 108 may be transferred, from the queue 122, to an available human-operated communication device 110.

However, other electronic actions are within the scope of the present specification, and such electronic actions may be based on a keyword 128, 132 identified on the call 108, and/or a response 126 of the caller 107 and/or measured stress of the caller 107.

For example, another electronic action may comprise moving the call 108 ahead in the queue 122, for example based on a keyword 128, 132 identified on the call 108 and/or an associated priority tag 136. For example, when a keyword 132 (e.g., as identified in the memory 130 from a keyword 128 on the call 108) is associated with a priority tag 136 of "high", the call 108 may be moved to the front of the queue 122 and/or to another queue (not depicted) of "high" priority calls 108, 109, which may be answered by a human-operated communication device 110 prior to calls 109 associated with priority tags 136 of "medium" or "low".

Alternatively, when a keyword 132 (e.g., as identified in the memory 130 from a keyword 128 on the call 108) is associated with a priority tag 136 of "critical", the call 108 may be transferred to the human-operated communication device 110c dedicated to critical calls, and/or moved to a queue (not depicted) of "critical" priority calls 108, 109, which may be answered by the human-operated communication device 110c when the a human-operated communication device 110c becomes available, and/or another a human-operated communication device 110c dedicated to critical calls.

In yet another example, an electronic action may comprise initiating a public-safety related call (e.g., a "911" call) to the PSAP 104-2, for example to a human-operated communication device 120 of the PSAP 104-2. In some examples, prior to such an initiating of a public-safety related call to the PSAP 104-2, the call-taking engine 103 may request permission on the call 108 to initiate the public-safety related call to the PSAP 104-2, and initiating such a public-safety related call to the PSAP 104-2 may occur when the permission is received. For example, when a response of the caller 107 includes given keywords 132 associated with crimes, such as "murder" (e.g., the caller 107 may say on the call 108 that "Someone is trying to murder me"), the call-taking engine 103 may ask "Can I call 911?" and, when the caller 107 says "Yes" and the like, the call-taking engine 103 may initiate a public-safety related call (e.g., a "911" call) to the PSAP 104-2.

In some of these examples, the call 108 may be bridged and/or transferred to the PSAP 104-2 as a public-safety related call. However in other examples the computing device 102 and/or the call-taking engine 103 may lack call bridging and/or call transferring functionality; in these examples, the call-taking engine 103 may initiate the public-safety related call and provide, to the PSAP 104-2 and/or a human-operated communication device 120 thereof, at least a phone number associated with the call 108. In addition, the call-taking engine 103 may provide to the PSAP 104-2 and/or a human-operated communication device 120 one or more of responses of the caller 107 on the call 108, keywords 128, 132 identified on the call 108, an associated priority tag 136, and/or indications an activity 134 and/or activities 134 that have been provide on the call 108, and the like. The PSAP 104-2 and/or a human-operated communication device 120 thereof may receive such information and responsively place a second public-safety related call to the phone number associated with the call 108 and in particular to the communication device 105; the responses of the caller 107 on the call 108, the keywords 128, 132 identified on the call 108, the associated priority tag 136, and/or the indications an activity 134 and/or activities 134 that have been provide on the call 108, and the like, may provide an operator of a human-operated communication device 120 of the PSAP 104-1 an indication of the mental health of the caller 107 such that the operator of the human-operated communication device 120 may better assist the caller 107 with a public-safety related issue and/or incident.

However, while the computing device 102 and/or the call-taking engine 103 may receive a phone number associated with the call 108 as caller ID (e.g., caller identification, a function of many communication networks as known to persons of skill in the art), due to privacy reasons the caller ID may be blocked and/or the computing device 102 and/or the call-taking engine 103 may be prevented from storing the phone number. In these examples, the call-taking engine 103, in association with requesting permission on the call 108 to initiate the public-safety related call to the PSAP 104-2 may ask the caller 107 for the phone number (e.g., when caller ID is blocked) and/or ask permission to share the phone number (e.g., when caller ID is not blocked). For example, the call-taking engine 103 may ask on the call 108 "May I share your phone number with 911?" and/or "May I have your phone number so that 911 may call you?" When the caller 107 responds with "Yes", and the like, the phone number may be shared with the PSAP 104-2 and/or a human-operated communication device 120 thereof. However, when the caller 107 responds with "No", and the like, the phone number may not be shared with the PSAP 104-2 and/or a human-operated communication device 120 thereof; in these examples, the call-taking engine 103 may respond with "OK, I understand, let's continue talking" and the call-taking engine 103 may continue to provide an activity 134 on the call 108.

Similarly, due to privacy reasons, the computing device 102 and/or the call-taking engine 103 may be prevented from storing responses of the caller 107 (e.g., as a recording and/or as converted to text), though such responses may be temporarily stored in a cache of the computing device 102, and the like, until the call 108 ends, for example to assist the call-taking engine 103 in identifying keywords 128, 132 on the call 108, and the like. As such, the call-taking engine 103, in association with requesting permission on the call 108 to initiate the public-safety related call to the PSAP 104-2 may ask the caller 107 for permission to share information collected on the call 108. For example, the call-taking engine 103 may ask on the call 108 "May I share information from this call with 911?" When the caller 107 responds with "Yes", and the like, the aforementioned information may be shared with the PSAP 104-2 and/or a human-operated communication device 120 thereof. However, when the caller 107 responds with "No", and the like, the aforementioned information may be not shared with the PSAP 104-2 and/or a human-operated communication device 120 thereof, though when the phone number of the communication device 105 is provided to the PSAP 104-2 and/or a human-operated communication device 120, a public-safety related call may still be placed to the communication device 105.

In some examples, when a public-safety related call is initiated, the call 108 may be removed from the queue 122 based on the call 108 being bridged and/or transferred to the PSAP 104-2 and/or a human-operated communication device 120, and/or based on a second public-safety related call being made to the communication device 105 from the PSAP 104-2 and/or a human-operated communication device 120. In the latter examples, the call-taking engine 103 may continue to provide an activity 134 on the call 108 until the second public-safety related call is received at the communication device 105; for example, the caller 107 may respond to the communication device 105 receiving the second public-safety related call and end the call 108 to answer the second public-safety related call and/or the caller 107 may provide a response on the call 108 indicating that the second public-safety related call is being received, and the call-taking engine 103 may end the call 108. Regardless, the call 108 is removed from the queue 122.

The call-taking engine 103 may have other functionality. For example, as depicted, the call-taking engine 103 may include, and/or have access to, a stress measurement engine 138 configured to monitor calls and measure stress of callers on the calls using, for example, a voice of a caller. For example, the stress measurement engine 138 may comprise a machine learning engine and/or algorithm, and the like, trained to receive audio of a human voice as an input and output an indicator of an estimated stress level based, for example, on one or more of keywords, word patterns, frequencies of the human voice, and the like. In some examples, the stress measurement engine 138 may hence comprise a frequency analyzer, and the like, which determines intensity, and/or relative intensity, of different frequencies of a voice of a caller, which may change over time to indicate changing stress; hence, stress of a caller may be measured as a function of frequencies of a voice of the caller. Put another way, in some examples, measuring stress level of a caller on a call may comprise measuring intensity or relative intensity of frequencies of a voice of a caller on a call. Put yet another way, the controller 218 and/or the computing device 102 may be configured to measure stress level of a caller on a call by measuring intensity or relative intensity of frequencies of a voice of the caller on the call. It is further understood that a frequency analyzer may be represented in FIG. 1, and throughout the present specification, by the stress measurement engine 138.

In some examples, the indicator of an estimated stress level output by the stress measurement engine 138 may comprise a number on a scale of 0 to 100, where "0" indicates a minimum stress level, and "100" indicates a maximum stress level. While the stress measurement engine 138 may output such an indicator without a baseline "normal" stress level for a particular caller, an increase or decrease in the indicator may respectively indicate an increase or decrease in stress. Such stress levels may also be shared with the PSAP 104-2 and/or a human-operated communication device 120 when a public-safety related call is initiated (e.g., and when permission to do is provided on the call 108).

In some examples, any of the aforementioned electronic actions for the call 109 may be implemented by the call-taking engine 103 based on measured stress level of the caller 107, and/or the measured stress level of the caller 107 increasing or decreasing. For example, when a measured stress level increases, and/or the measured stress level increases above a threshold stress level (e.g., "80" on the aforementioned scale of 0 to 100), the call 108 may be escalated in the queue 122 (e.g., moved to the front and/or closer to the front of the queue 122) and/or the call 108 may be placed in a queue for the human-operated communication device 110c dedicated to critical priority calls, and the like, and/or the call 108 may be transferred as soon as possible to the human-operated communication device 110c when the human-operated communication device 110c is available. In some of these examples, a priority tag 136 for the call 108 may be changed to "critical", and the like, if not already "critical".

For example, measuring the stress level of the caller changing may comprise the controller 218 and/or the computing device 102 and/or the stress measurement engine 138 and/or a frequency analyzer measuring changing intensity or changing relative intensity of frequencies of a voice of a caller on a call, and certain first given changes in intensity or relative intensity may be associated with increases in stress level of the caller on the call, while other certain second given changes in intensity or relative intensity may be associated with decreases in stress level of the caller on the call.

Other functionality of the computing device 102 and/or the call-taking engine 103 is described in more detail below.

Figure 2:
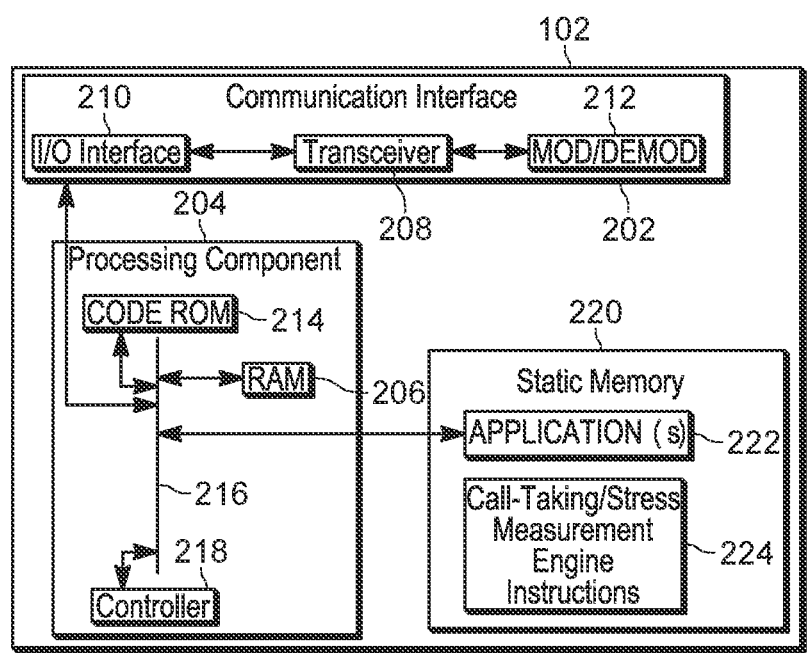
FIG. 2 is a device diagram showing a device structure of a computing device to initiate electronic actions on calls and manage call-taking resources, in accordance with some examples.

Attention is next directed to FIG. 2, which depicts a schematic block diagram of an example of the computing device 102. While the computing device 102 is depicted in FIG. 2 as a single component, functionality of the computing device 102 may be distributed among a plurality of components and the like including, but not limited to, any suitable combination of one or more servers, one or more cloud computing devices, one or more proxy devices, and the like. In some examples, a portion of the functionality of the computing device 102 may be integrated with the PSAP 104.

As depicted, the computing device 102 comprises: a communication interface 202, a processing unit 204, a Random-Access Memory (RAM) 206, one or more wireless transceivers 208 (e.g., which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 102 may have any suitable structure and/or configuration. Furthermore, a portion of the memory 220 may comprise the memory 130.

While not depicted, the computing device 102 may include, and/or be in communication with, one or more of an input device and a display screen (and/or any other suitable notification device) and the like, such as the input device 116 and/or the display screen 114 of the human-operated communication device 110, and the like.

As shown in FIG. 2, the computing device 102 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality to initiate electronic actions on calls and manage call-taking resources. For example, in some examples, the computing device 102 and/or the controller 218 specifically comprises a computer executable engine configured to implement functionality to initiate electronic actions on calls and manage call-taking resources.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

As depicted, the memory 220 further stores one or more sets of programming instructions 224 that, when executed by the controller 218, enables the controller 218 to implement the call-taking engine 103 and (when present) the stress measurement engine 138. The programming instructions 224 may further comprise instructions for implementing a text-to-voice module and/or a voice-to-text module.

While the one or more sets of programming instructions 224 are depicted as separate from the at least one application 222, one or more of the sets of programming instructions 224 may be a component and/or a module of the application 222.

Figure 3:
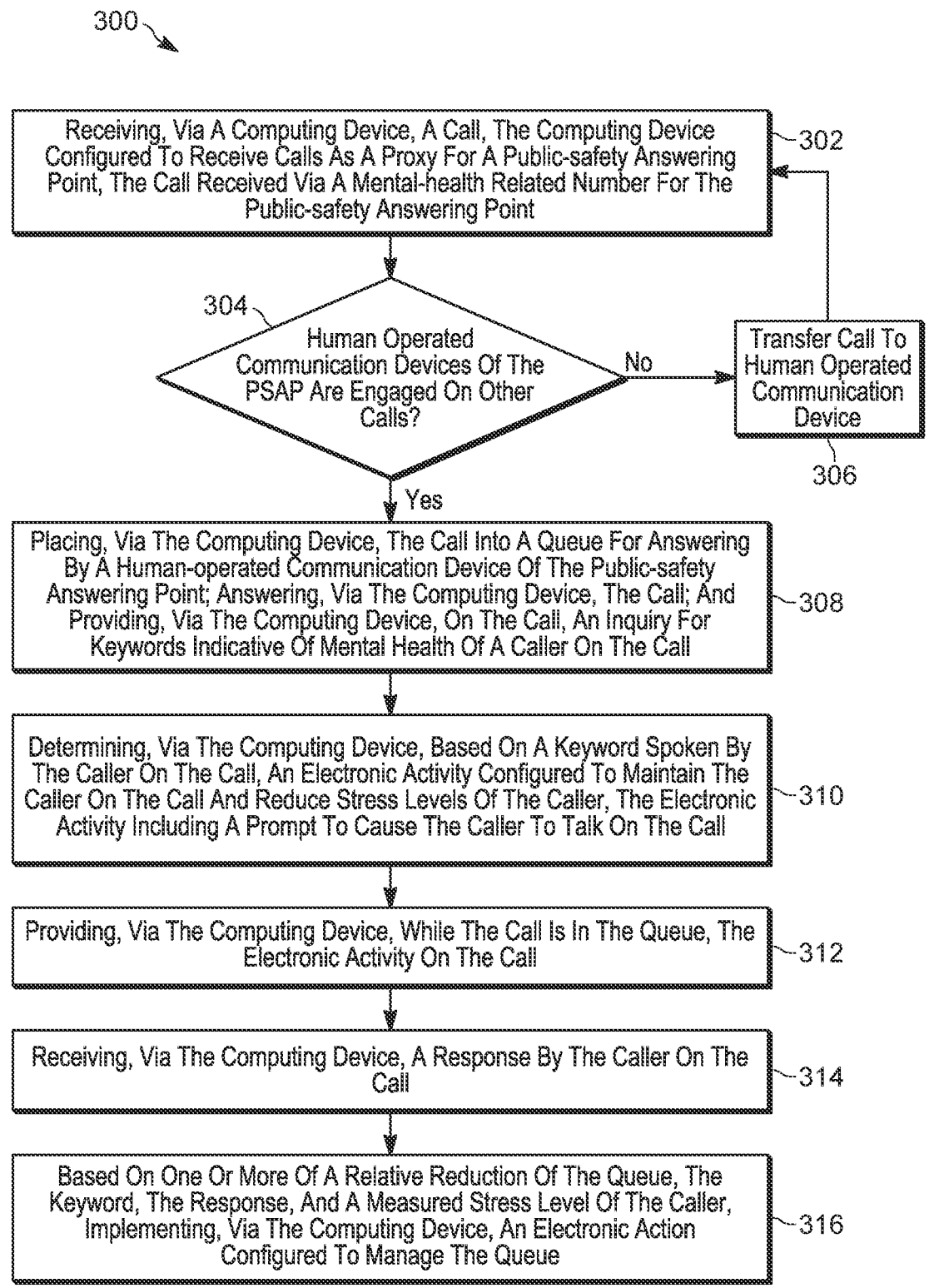
FIG. 3 is a flowchart of a method to initiate electronic actions on calls and manage call-taking resources, in accordance with some examples.

Regardless, it is understood that the memory 220 stores instructions corresponding to the at least one application 222 (and/or the programming instructions 224) that, when executed by the controller 218, enables the controller 218 to implement functionality to initiate electronic actions on calls and manage call-taking resources, including, but not limited to, the blocks of the method set forth in FIG. 3.

The application 222 and/or the programming instructions 224 may include programmatic algorithms, and the like, to implement functionality as described herein.

Alternatively, and/or in addition, application 222 and/or the programming instructions 224 may include one or more machine learning algorithms that may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments, such as PSAP environments, and the like. Any suitable machine learning algorithm and/or deep learning algorithm and/or neural network is within the scope of present examples.

While details of the PSAP 104 (e.g., the PSAPs 104-1, 104-2), the communication devices 105, 106 the human-operated communication devices 110, 110c, 120 are not depicted, the PSAP 104, the communication devices 105, 106 the human-operated communication devices 110, 110c, 120 may have components similar to the computing device 102 adapted, however, for the functionality thereof.

Attention is now directed to FIG. 3, which depicts a flowchart representative of a method 300 to initiate electronic actions on calls and manage call-taking resources. The operations of the method 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222 and/or the instructions 224. The method 300 of FIG. 3 is one way that the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218, and/or the computing device 102, receives (e.g., via the communication interface 202), the call 108, the controller 218, and/or the computing device 102 configured to receive calls as a proxy for a public-safety answering point 104, the call 108 received via a mental-health related number for the public-safety answering point 104.

At a block 304, the controller 218, and/or the computing device 102 determines whether human-operated communication devices 110 of the public-safety answering point 104 are engaged on other calls 109. If not (e.g., a "NO" decision at the block 304 and/or a human-operated communication device 110 is available to take the call 108) at a block 306, the controller 218, and/or the computing device 102 transfers the call 108, from the queue 122, to an available human-operated communication device 110.

However, based on determining that human-operated communication devices 110 of the public-safety answering point 104 are engaged on other calls 109 (e.g., a "YES" decision at the block 304), at a block 308, the controller 218, and/or the computing device 102: places the call 108 into the queue 122 for answering by a human-operated communication device 110 of the public-safety answering point 104; answers the call 108; and provides on the call 108 the inquiry 124 for keywords 128 indicative of mental health of a caller on the call 108. In particular, answering the call 108 and providing the inquiry 124 on the call 108 may be performed via the controller 218, and/or the computing device 102 implementing the call-taking engine 103.

At a block 310, the controller 218, and/or the computing device 102 determines, based on a keyword 128 spoken by the caller 107 on the call 108, an electronic activity 134 configured to maintain the caller 107 on the call 108 and reduce stress levels of the caller 107, the electronic activity 134 including a prompt to cause the caller 107 to talk on the call 108. In particular, determining the electronic activity 134 may be performed via the controller 218, and/or the computing device 102 implementing the call-taking engine 103.

For example, in instances where the call-taking engine 103 comprises a machine learning engine, the controller 218 and/or the computing device 102 is understood to implement a machine learning engine configured to determine the electronic activity 134 from the keyword 128.

Alternatively, and/or in addition, the electronic activity 134 may be determined from the keyword 128 using a database of keywords 132 associated with electronic activities 134.

At a block 312, the controller 218, and/or the computing device 102, provides, while the call 108 is in the queue 122, the electronic activity 134 on the call 108. In particular, providing the electronic activity 134 on the call 108 may be performed via the controller 218, and/or the computing device 102 implementing the call-taking engine 103.

It is further understood that the controller 218 and/or the computing device 102 and/or the call-taking engine 103 may provide estimated wait times on the call 108, for the call 108 to be transferred to a human-operated communication device 110. Such estimated wait times may be provided in a form of a relative reduction of a current estimated wait time, compared to an initial estimated wait time. For example, when an estimated initial wait time was 10 minutes, and the current estimated wait time is reduced to 4 minutes, the call-taking engine 103 may provide, on the call, "Your estimated wait time has been reduced from 10 minutes to 4 minutes", and the like.

At a block 314, the controller 218, and/or the computing device 102, via the controller 218, and/or the computing device 102 implementing the call-taking engine 103, receives the response 126 by the caller 107 on the call 108 (e.g., via the communication interface 202). In particular, receiving the response 126 may be performed via the controller 218, and/or the computing device 102 implementing the call-taking engine 103.

At a block 314, the controller 218, and/or the computing device 102, based on one or more of a relative reduction of the queue 122, the keyword 132, the response, and a measured stress level of the caller 107, implements an electronic action configured to manage the queue 122.

The method 300 may include further features.

For example, the method 300 may further comprise the controller 218 and/or the computing device 102: determining based on the keyword 128: a priority tag 136 for the call 108; tagging the call 108 with the priority tag 136; and comparing the priority tag 136 to a threshold condition, wherein based on the priority tag 136 meeting the threshold condition the electronic action comprises one or more of: escalating the call 108 in the queue; and transferring the call 108, from the queue 122 (e.g., and from the call-taking engine 103), to an available human-operated communication device 106.

For example, as has previously been described, determining a priority tag 136 from the keyword 128 may comprise a database lookup of the keywords 132 to identify an associated priority tag 136, and/or determining a priority tag 136 from the keyword 128 may comprise implementing a machine learning engine (e.g., the call-taking engine 103) trained to determine priority tags from keywords.

Furthermore, tagging the call 108 with the priority tag 136 may comprise adding the priority tag 136 to metadata of the call 108, which may be provided to an available human-operated communication device 106 when the call 108 is later transferred to the available human-operated communication device 106. The priority tag 136 may be provided at the display screen 114 (e.g., via the interface 118) and/or via a speaker of the headset 119, such that the operator 112 is provided with a visual and/or audible indication of a priority (e.g., a risk level) associated with the call 108.

Furthermore, the threshold condition may comprise the priority tag 136 being in a given category, such as "critical", and/or "1".

Alternatively, and/or in addition, the threshold condition may comprise a number of the priority tag 136, such as "1" (e.g., corresponding to "critical"), being less than a given threshold number, such as "2". Such an example presumes that a priority tag 136 indicates risks using a scale of 1 to 4, where "1" indicates "critical" risk and "4" indicates "low" risk.

However, in other examples, a priority tag 136 indicate risks using a scale of 4 to 1, where "4" indicates "critical" risk and "1" indicates "low" risk, the threshold condition may comprise a number of the priority tag 136, such as "4" (e.g., corresponding to "critical"), being greater than a given threshold number, such as "3". It is understood however that any suitable numeric scale may be used for the priority tags 136, and any suitable threshold condition may be used for the priority tags.

In these examples, it is understood that the threshold condition may be selected such that calls 108 tagged as "critical" may be escalated in the queue 122 (e.g., placed at the front of the queue 122 and/or moved closer to the front of the queue 122, and/or placed into a queue for critical calls, and the like). Alternatively, and/or in addition, it is understood that the threshold condition may be selected such that calls 108 tagged as "critical" may be transferred from the queue 122 (e.g., and from the call-taking engine 103), to an available human-operated communication device 110, such as the human-operated communication device 110*c* dedicated to critical priority calls.

In further examples, it is understood that the electronic activity 134 provided at the block 312 is one electronic activity 134 of a plurality of electronic activities 134. In these examples, the method 300 may further comprise the controller 218 and/or the computing device 102: measuring, based on responses by the caller 107 on the call 108, a stress level of the caller 107; and adjusting the electronic activity 134 based on the measured stress level. In particular, the method 300 may further comprise the controller 218 and/or the computing device 102: based on the measured stress level of the caller 107 increasing, providing, on the call 108, a first electronic activity 134 of the plurality of electronic activities 134; or based on the measured stress level of the caller 107 decreasing, providing, on the call 108, a second electronic activity 134 of the plurality of electronic activities 134.

For example, as has already been described, during the call 108, the call-taking engine 103 may provide a plurality of electronic activities 134 in an order according to how the electronic activities 134 have been heuristically determined to reduce stress in callers, such as, in order, asking "54321" questions, asking math problems, asking to recite the alphabet and asking to make food.

In these examples, when a given activity 134 is being provided on the call 108, and the stress measurement engine 138 determines that stress of the caller 107 is increasing, the call-taking engine 103 may end the given activity 134 (e.g., using a statement such as "Let's stop this activity and do something else), and provide another activity 134 (e.g., the aforementioned first activity 134) that has been heuristically determined to reduce stress in callers more than the given activity 134 that has ended. For example, when the call-taking engine 103 is providing a given activity 134 of math problems, and measured stress of the caller 107 is increasing, the call-taking engine 103 may end the math problems and begin asking the caller 107 "54321" questions.

Similarly, when a given activity 134 is being provided on the call 108, and the stress measurement engine 138 determines that stress of the caller 107 is decreasing, the call-taking engine 103 may end the given activity 134 (e.g., using a statement such as "Let's stop this activity and do something else), and provide another activity 134 (e.g., the aforementioned second activity 134) that has been heuristically determined to reduce stress in callers less than the given activity 134 that has ended. For example, when the call-taking engine 103 is providing a given activity 134 of math problems, and measured stress of the caller 107 is decreasing, the call-taking engine 103 may end the math problems and begin asking the caller 107 to recite the alphabet.

In further examples, as has already been described, the method 300 may further comprise the controller 218 and/or the computing device 102: requesting permission, on the call 108, to place a public-safety related call; and based on the permission being received on the call 108, and while the call 108 is maintained by the computing device, initiating the public-safety related call.

In further examples, the method 300 may further comprise the controller 218 and/or the computing device 102: monitoring, on the call, background noises different from a voice of the caller 107; and based on the background noises meeting given criteria associated with the caller 107 being in physical danger and/or a crime being committed, and the like, and while the call 108 is maintained by the controller 218 and/or the computing device 102 and/or the call-taking engine 103, initiating a public-safety related call.

In a particular example, the background noises that meet the given criteria include a gunshot, a cry for help, and the like.

For example, the call-taking engine 103 may be trained and/or configured to detect certain noises, such as gunshots, cries for help, and the like, in the background of a call that are different from a voice of a caller on the call. Hence, when the call-taking engine 103 includes a machine learning engine and/or algorithm in the form of a neural network, layers of the neural network may be configured to detect different background noises. As such, the given criteria may be in the form of such layers of a neural network.

In these examples, the controller 218 and/or the computing device 102 and/or the call-taking engine 103 may initiate a public-safety related call, such as a "911" call, to the PSAP 104-2 and/or a human-operated communication device 120 thereof, when the background noises that meet the given criteria are detected. In some of these examples, permission may be requested on the call 108 to initiate the public-safety related call. However in certain specific examples, such as when a gunshot is detected, and/or any other background noise indicative of a crime being committed and/or persons being in danger, the public-safety related call may be initiated without such permission, with the phone number associated with the call 108, as well as any other associated available information, being provided to the PSAP 104-2 and/or a human-operated communication device 120 thereof. It is understood that initiating a public-safety related call in the absence of permission may occur, and/or only occur, under certain specific circumstances (e.g., such as the aforementioned gunshot being detected on the call 108) as mental-health related calls are generally subject to privacy regulations that protect privacy of callers on such calls.

Attention is next directed to FIG. 4, FIG. 5, FIG. 6, FIG. 7, FIG. 8, FIG. 9 and FIG. 10 that depict aspects of the method 300. FIG. 4, FIG. 5, FIG. 6, FIG. 7, FIG. 8, FIG. 9 and FIG. 10 are substantially similar to FIG. 1 with like components having like numbers.

Figure 4:
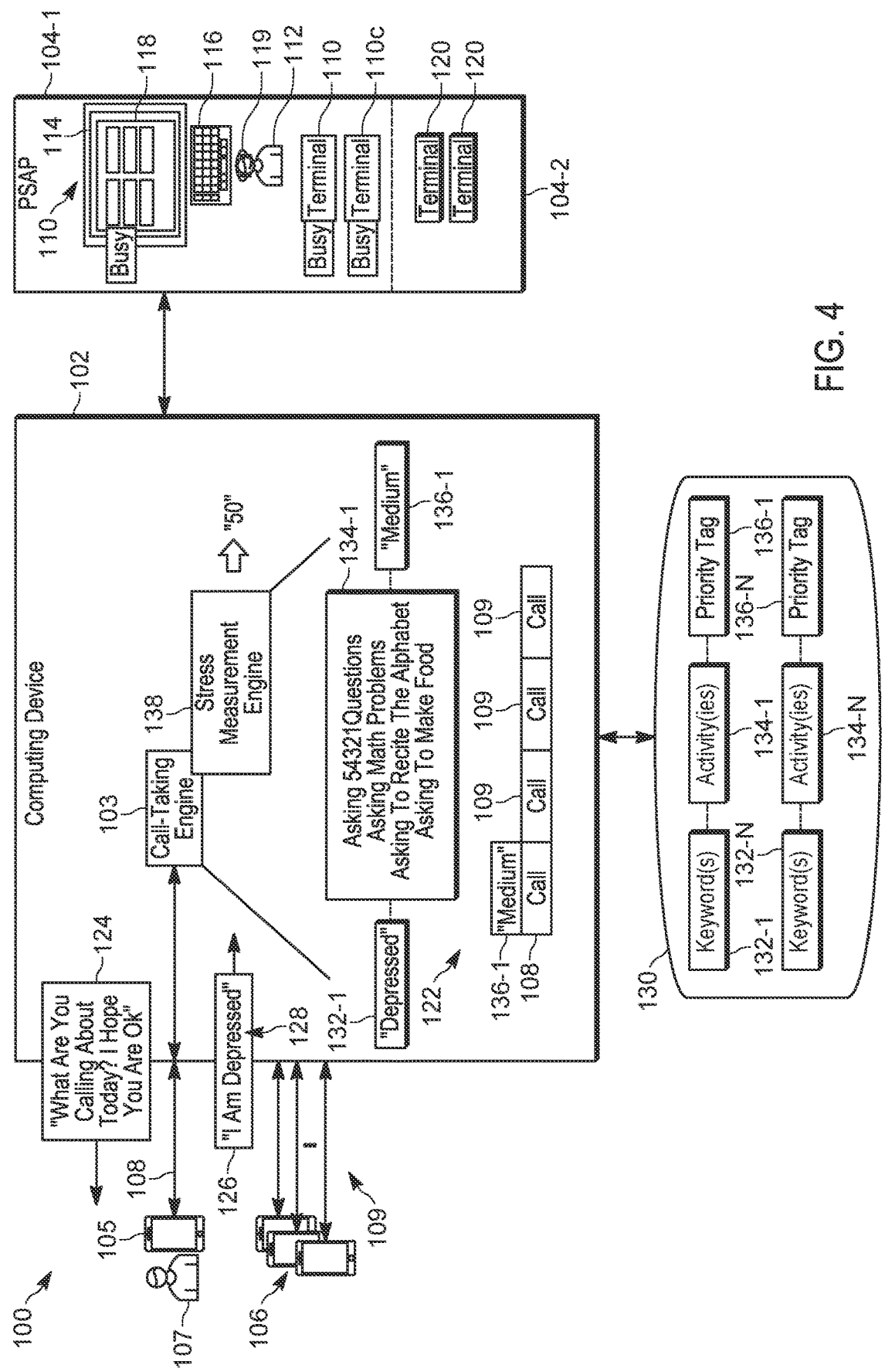
FIG. 4 depicts the system of FIG. 1 implementing aspects of a method to initiate electronic actions on calls and manage call-taking resources, in accordance with some examples.

Attention is next directed to FIG. 4 that, like FIG. 1, depicts the call 108 being received (e.g., at the block 302 of the method 300) at the computing device 102, and, based on the computing device 102 determining that human-operated communication devices 110 of the PSAP 104-1 are engaged on other calls 109 (e.g., a "YES decision at the block 304 of the method 300), the computing device 102 places the call 108 at the end of the queue 122 (e.g., at the block 308 of the method 300). The computing device 102 further answers the call 108 via the call-taking engine 103, and the call-taking engine 103 provides the inquiry 124 on the call 108. FIG. 4 further depicts the call-taking engine 103 receiving the response 126 that include the keyword 128 "depressed".

The call-taking engine 103 compares the keyword 128 "depressed" with the keywords 132 and, as depicted, determines (e.g., at the block 310 of the method 300) that the keywords 132-1, as stored at the memory 130, include the word "Depressed" and retrieves, from the memory 130 the associated activities 134-1 and the associated priority tag 136-1. Hence, FIG. 4 further depicts the computing device 102 (e.g., at the block 310 of the method 300), determining, based on the keyword 128 spoken by the caller 107 on the call 108, an electronic activity 134-1.

For example, the activities 134-1 include asking "54321" questions, asking math problems, asking to recite the alphabet and asking to make food. The priority tag 136-1 comprises an indicator of "Medium" and the call 108 is depicted as being tagged with the priority tag 136-1 in the queue 122.

Furthermore, as depicted, the stress measurement engine 138 has determined a measured stress of the caller 107 of "50" (e.g., on a scale of 0 to 100, where "0" indicates minimum stress and "100" indicates maximum stress). For example, the measured stress of the caller 107 of "50" may comprise baseline measured stress as measured at a beginning of the call 108.

Figure 5:
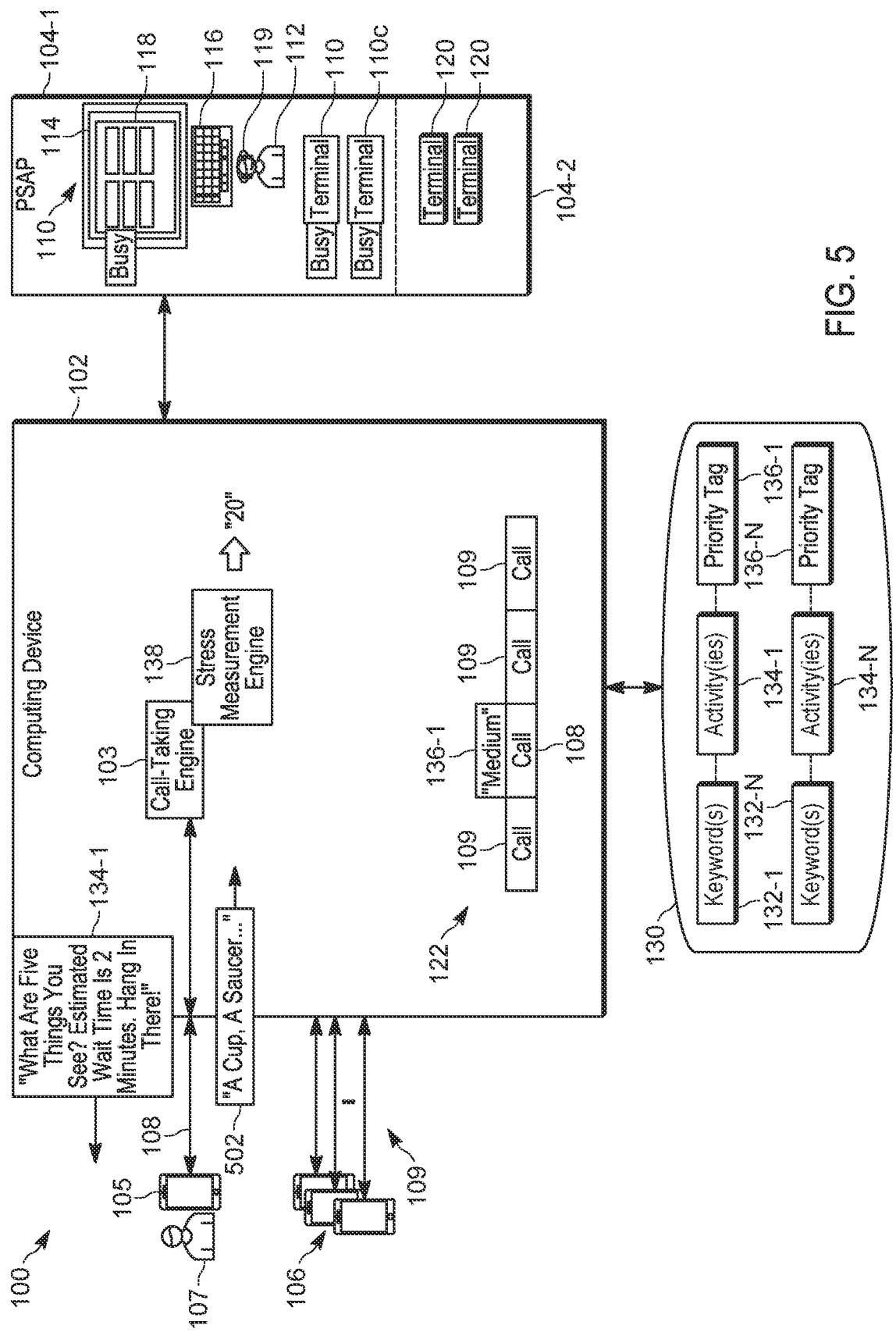
FIG. 5 depicts the system of FIG. 1 continuing to implement aspects of a method to initiate electronic actions on calls and manage call-taking resources, in accordance with some examples.

Attention is next directed to FIG. 5, which follows, in time, from FIG. 4. In particular, FIG. 5 depicts the call-taking engine 103 providing (e.g., at the block 312 of the method 300), the first electronic activity 134-1, of the electronic activities 134-1, on the call 108. For example, the call-taking engine 103 is asking the caller 107 "What are five things you see?" (first question of 54321" questions), as well as providing an estimated wait time. FIG. 5 further depicts the call-taking engine 103 receiving (e.g., at the block 314 of the method 300) a response 502 by the caller 107 on the call 108. For example, the caller 107 responds to "What are five things you see?" with "A cup, a saucer . . . ", etc.

Furthermore, as depicted, the stress measurement engine 138 has determined a measured stress of the caller 107 of "20", indicating that the measured stress level of the caller 107 is decreasing, relative to the (e.g., baseline) measured stress of the caller 107 of "50" depicted in FIG. 4. While not depicted, the call-taking engine 103 may responsively provide a different activity 134-1 on the basis of the measured stress level decreasing.

As also depicted in FIG. 5, the call 108 has moved up in the queue 122 (e.g., from a last position to a second last position). The human-operated communication devices 110 all continue to be engaged on other calls 109.

Figure 6:
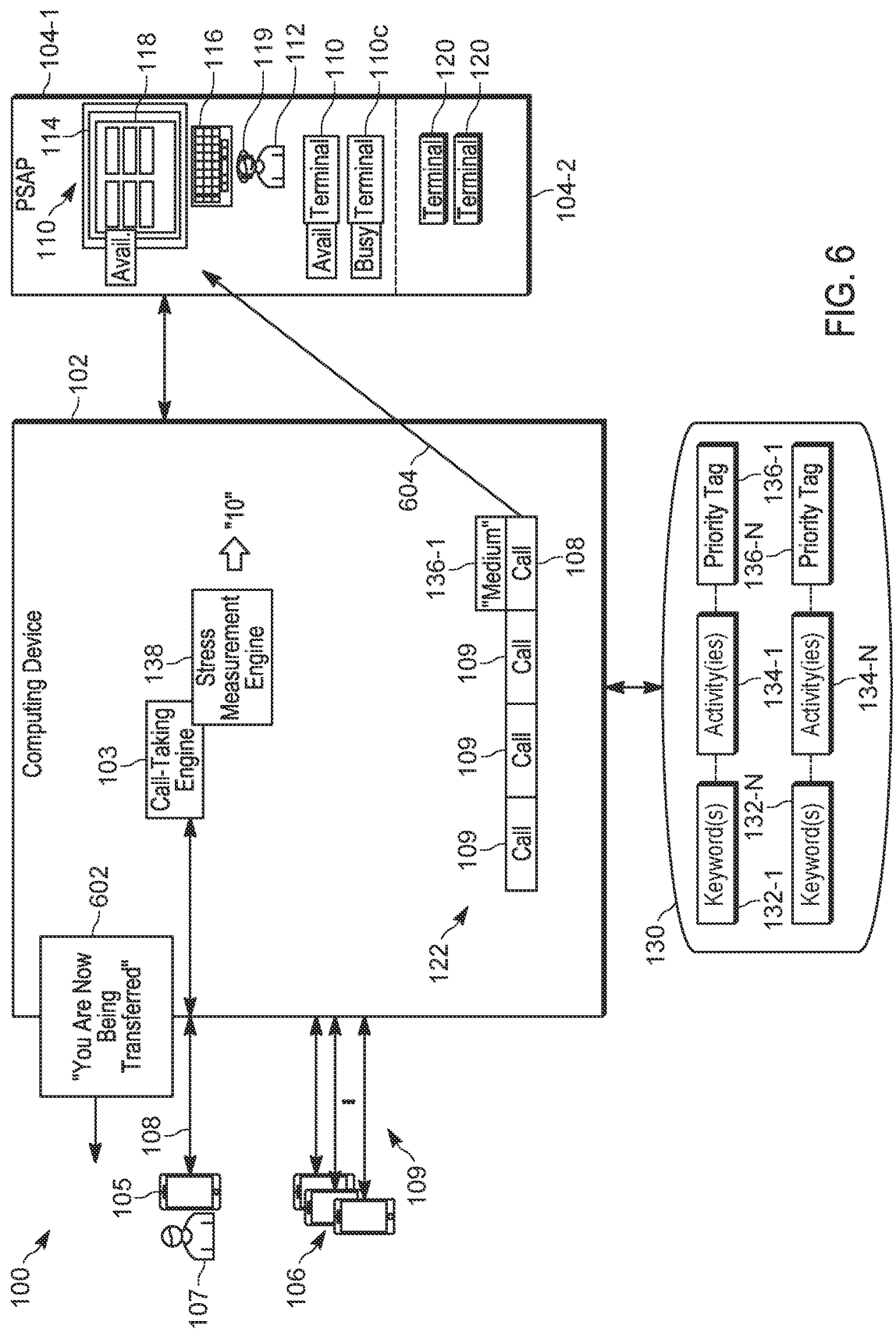
FIG. 6 depicts the system of FIG. 1 continuing to implement aspects of a method to initiate electronic actions on calls and manage call-taking resources, in accordance with some examples.

Attention is next directed to FIG. 6, which follows, in time, from FIG. 4.

In particular, FIG. 6 depicts that the call 108 is now first in the queue 122, and that a human-operated communication device 110 has become available (e.g., as indicated by "Avail."). As such, the call-taking engine 103 provides an indication 602 that the call 108 is being transferred (e.g., "You are now being transferred") and transfers the call 108 from the queue 122 to the available human-operated communication device 110, as indicated by an arrow 604. Hence, FIG. 6 further depicts the computing device 102 (e.g., at the block 316 of the method 300), based on a relative reduction of the queue 122, implementing, an electronic action configured to manage the queue 122 (e.g., the transfer of the call 108 to the available human-operated communication device 110). In this instance, the queue 122 is reduced due to the transfer of the call 108 to the available human-operated communication device 110, freeing processing resources and/or bandwidth at the computing device 102 to receive more calls 109.

Furthermore, as depicted, the stress measurement engine 138 has determined a measured stress of the caller 107 of "10", indicating that the measured stress level of the caller 107 is decreasing relative to the measured stress of the caller 107 of "20" depicted in FIG. 5.

Figure 7:
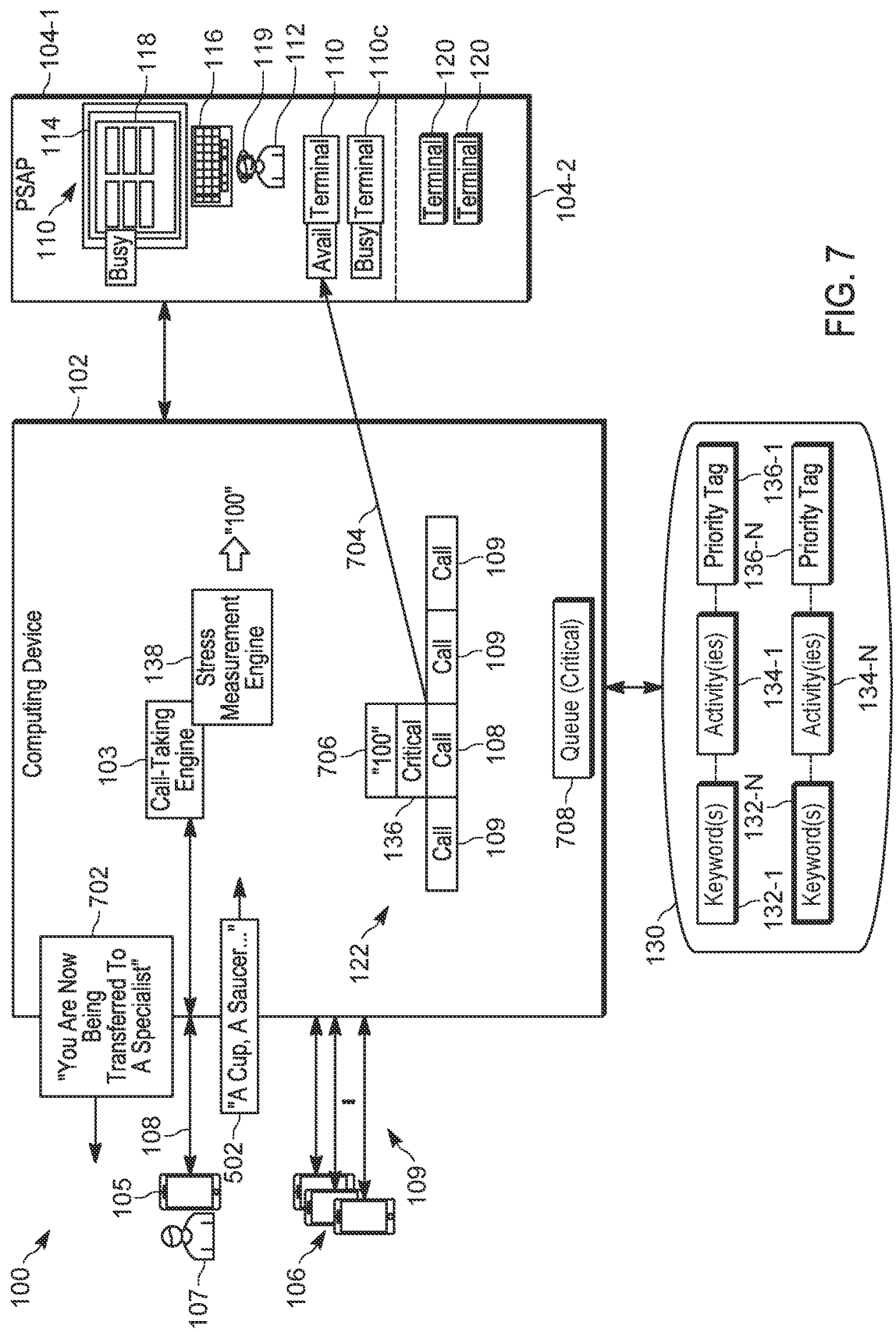
FIG. 7 depicts the system of FIG. 1 implementing further aspects of a method to initiate electronic actions on calls and manage call-taking resources, in accordance with some examples.

Attention is next directed to FIG. 7, which depicts a different scenario that may follow from FIG. 4 and/or FIG. 5. For example, it is understood in FIG. 7 that the example of FIG. 4 has occurred and that the activity 134-1 of FIG. 5 was provided on the call 108. Hence, the call-taking engine 103 is receiving the same response 502 on the call 108 as depicted in FIG. 5 (e.g., "A cup, a saucer . . . " etc.). However, in contrast to FIG. 5, the stress measurement engine 138 has determined a measured stress of the caller 107 of "100", indicating that the measured stress level of the caller 107 is increased relative to the measured stress of the caller 107 of "50" depicted in FIG. 4 (and/or relative to the measured stress of the caller 107 of "20" depicted in FIG. 5). In this example, even though the call 108 is not first in the queue 122, the call 108 may be transferred (e.g., as represented by an arrow 704) to the human-operated communication device 110c which is depicted as available in FIG. 7.

In particular, due to the measured stress of "100" exceeding a threshold stress level (e.g., of "80"), the call 109 is transferred to the human-operated communication device 110c dedicated to critical priority calls. Furthermore, due to the measured stress of "100" exceeding the threshold stress level, a priority tag 136 of the call 108 is changed from "Medium" (as depicted in FIG. 4) to "Critical". Furthermore, another tag 706 is added (e.g., as metadata) to the call 108 indicating the measured stress level of "100".

Hence, FIG. 7 further depicts the computing device 102 (e.g., at the block 316 of the method 300), based a measured stress level, implementing, an electronic action configured to manage the queue 122 (e.g., the transfer of the call 108 to the available human-operated communication device 110c dedicated to critical priority calls). In this instance, the queue 122 is reduced due to the transfer of the call 108 to the available human-operated communication device 110, freeing processing resources and/or bandwidth at the computing device 102 to receive more calls 109.

The example of FIG. 7 presumes the human-operated communication device 110c is available. However, when a human-operated communication device 110c dedicated to critical priority calls is not available, the call 108 may be placed in a queue 708 for human-operated communication device 110c dedicated to critical priority calls which may be answered more quickly than calls in the queue 122. It is understood that when the call 108 is transferred to such a queue 708, the call-taking engine 103 continues to provide an activity 134 on the call 108.

Figure 8:
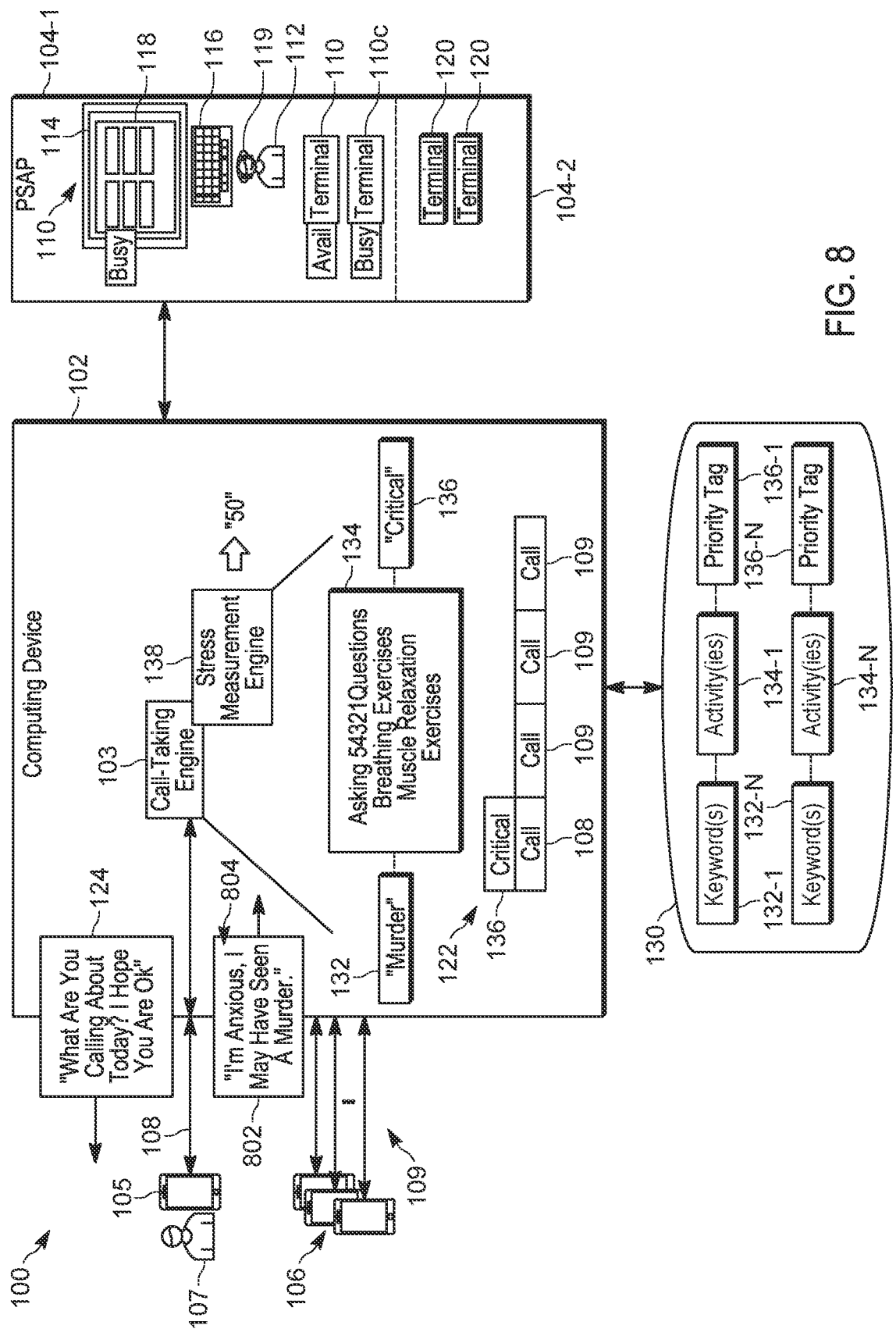
FIG. 8 depicts the system of FIG. 1 implementing yet further aspects of a method to initiate electronic actions on calls and manage call-taking resources, in accordance with some examples.

Attention is next directed to FIG. 8, which is similar to FIG. 4, but rather than the response 126 of "I am depressed" to the inquiry 124, the call-taking engine 103 receives a response of "I'm anxious, I may have seen a murder." As such, the call-taking engine 103 identifies a keyword 804 of "murder" in the response 126.

The call-taking engine 103 compares the keyword 804 "murder" with the keywords 132 and, as depicted, determines that a set of keywords 132, stored at the memory 130, includes the word "Murder" and retrieves, from the memory 130, associated activities 134 and an associated priority tag 136.

For example, the associated activities 134 include asking "54321" questions, breathing exercises and muscle relaxation exercises. The associated priority tag 136 comprises an indicator of "Critical" and the call 108 is depicted as being tagged with the associated priority tag 136 in the queue 122.

While the call-taking engine 103 might also identify another keyword of "anxious" on the call 108, a corresponding keyword 132 stored at the memory 130 may be associated with a lower priority keyword of "Low" (e.g., as indicated by an associated priority tag 136), and hence the call-taking engine 103 may rank a plurality of keywords detected in the call 108 according to priority and select associated activities 134 and electronic actions for the highest priority keyword. For example, the call-taking engine 103 may perform a database lookup at the memory 130 for each keyword 132 detected on the call 108 and select associated activities 134 for the keyword 132 having the highest priority tag 136, and perform electronic actions based on the highest priority keyword 132 and/or highest priority tag 136. When there is a conflict such that more than keyword 132 has a same associated priority, the call-taking engine 103 may retrieve activities 134 associated with all the keywords 132 and combine them accordingly, which may include, but is not limited to, deduplicating activities 134.

Furthermore, as depicted, the call 108 has been tagged with the priority tag 136 of "Critical" in the queue 122.

Furthermore, as depicted, the stress measurement engine 138 has determined a measured stress of the caller 107 of "50".

Figure 9:
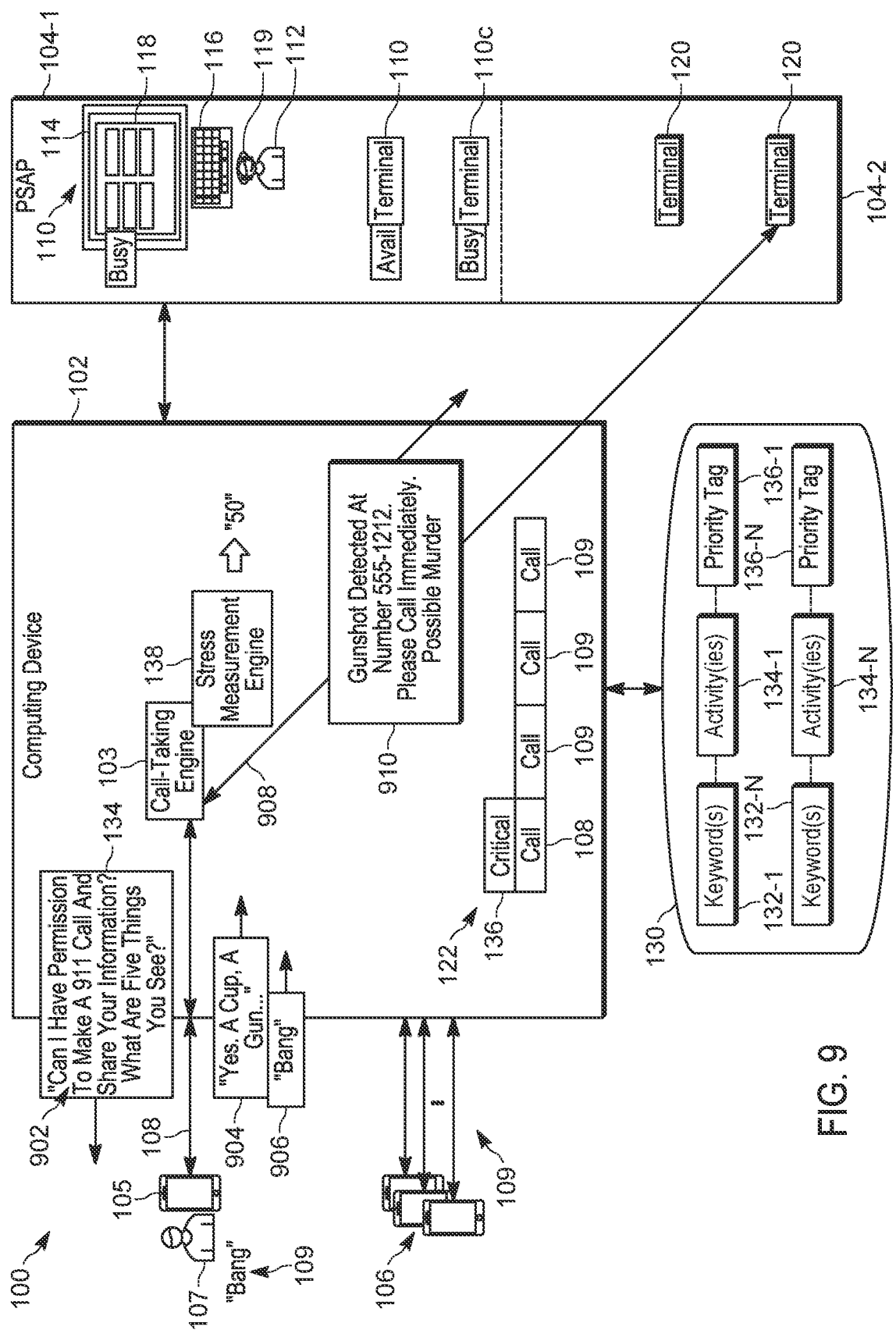
FIG. 9 depicts the system of FIG. 1 implementing yet further aspects of a method to initiate electronic actions on calls and manage call-taking resources, in accordance with some examples.

Attention is next directed to FIG. 9, which follows, in time, from FIG. 8.

In particular, FIG. 9 depicts the call-taking engine 103 providing the first electronic activity 134, of the electronic activities 134, on the call 108. For example, the call-taking engine 103 is asking the caller 107 "What are five things you see?".

However, prior to providing the electronic activity 134, as the keyword 804 was "murder", the call-taking engine 103 asks for permission to initiate a public-safety call to the PSAP 104-2; for example, the call-taking engine 103 provides an inquiry 902 of "Can I have permission to make a 911 call and share your information?" As such, a response 904 includes granting of the permission in form of the word "Yes", as well as a response to the question "What are five things you see?", of "A cup, a gun . . . ".

As further depicted in FIG. 9, the call-taking engine 103 further detects a background noise 906 of a gunshot (e.g., "BANG").

Furthermore, as depicted, the stress measurement engine 138 has determined a measured stress of the caller 107 of "50", indicating that the measured stress level of the caller 107 has stayed the same relative to as measured in FIG. 8.

As also depicted, in FIG. 9, due to the permission of "YES" being received, and/or the detection of the gunshot in the background noise 906, the call-taking engine 103 initiates a call 908 (e.g., a "911" call) to the PSAP 104-2 and/or a human-operated communication device 120 thereof, and provides, on the call 908, information 910 associated with the call 108, such as "Gunshot Detected at Number 555-1212, Please Call Immediately. Possible Murder". The information 910 includes the phone number (e.g., "555-1212") associated with the call 108, which may be received on the call 108 or determined by the computing device 102 via callerID, and the like.

In some examples, the response 904 including the word "gun" may also cause the call 908 to be initiated. Hence, in some examples, certain words in responses may cause initiating of a public-safety call, for example once permission is received, though some words and/or groups of words) may cause public-safety calls to be initiated without permission, such as "I have a gun and will use it" or "Someone with me has a gun and is waving it around", and the like, which indicate a clear expression of a crime being committed and/or harm to a caller. Hence, the call-taking engine 103 may further be configured to detect words in responses on calls that clearly indicate that a crime is being committed and/or harm to a caller, and responsively initiate public-safety calls.

In some examples, the keyword 804 of "murder" may also cause the call 908 to be initiated. Hence, in some examples, certain keywords may cause initiating of a public-safety call, for example once permission is received, though some keywords and/or groups of keywords) may cause public-safety calls to be initiated without permission, such as "I murdered someone" or "I just saw a murder" or "Someone is trying to murder me", and the like, which indicate a clear expression of a crime being committed and/or harm to a caller. Hence, the call-taking engine 103 may further be configured to detect keywords on calls that clearly indicate that a crime is being committed and/or harm to a caller, and responsively initiate public-safety calls.

Figure 10:
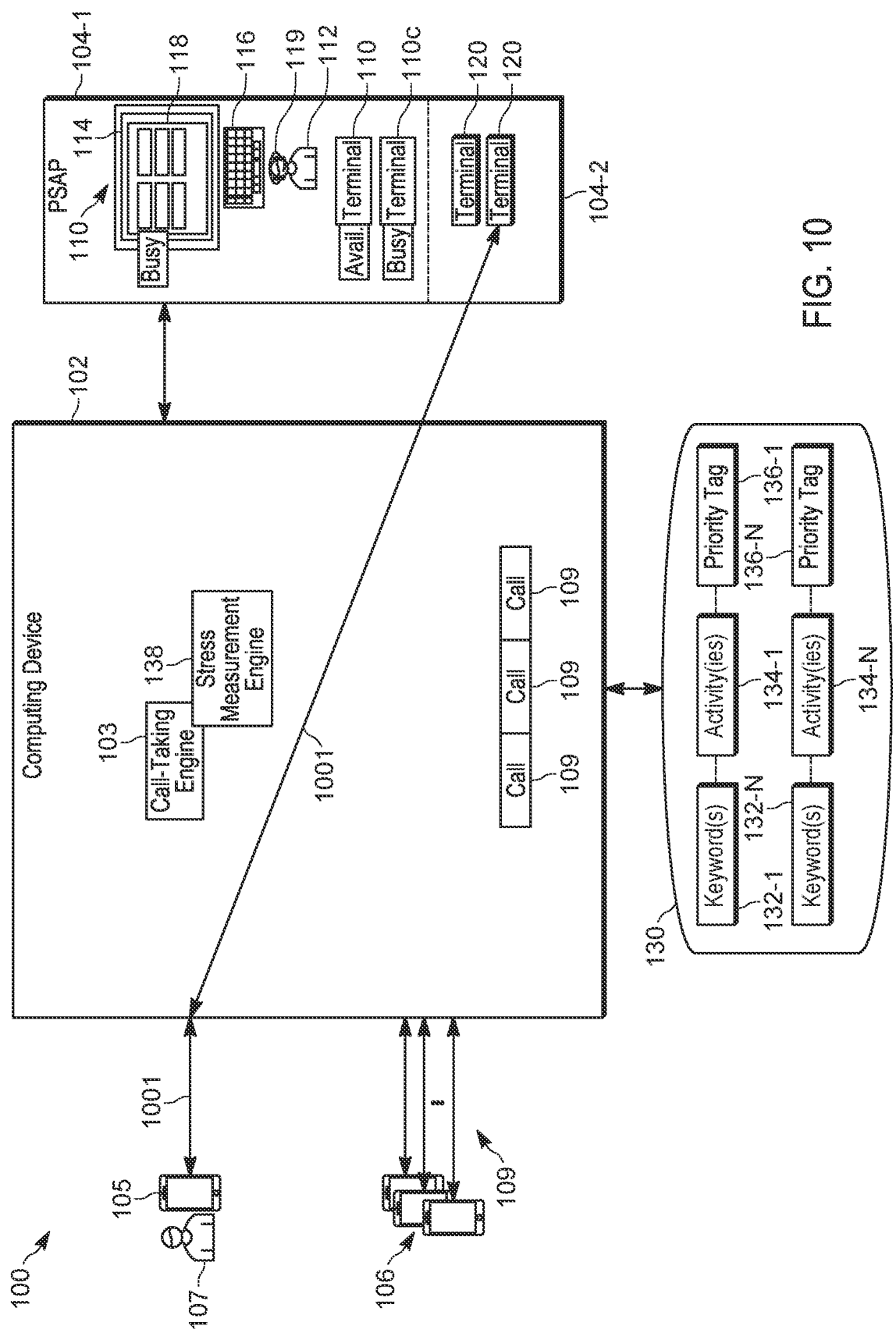
FIG. 10 depicts the system of FIG. 1 implementing yet further aspects of a method to initiate electronic actions on calls and manage call-taking resources, in accordance with some examples.

Attention is next directed to FIG. 10, which depicts the PSAP 104-2 and/or the human-operated communication device 120 thereof on a public-safety related call 1001 with the communication device 105, initiated, for example, in response to the call 908. In some examples, the call 1001 may comprise the call 108 transferred to and/or bridged to the PSAP 104-2 and/or the human-operated communication device 120 thereof. In some examples, the call 1001 may comprise the call 908 transferred to and/or bridged to the communication device 105 thereof. In some examples, the call 1001 may be a new call from the PSAP 104-2 and/or the human-operated communication device 120 to the communication device 105. Regardless, as also depicted in FIG. 10, the call 108 has been removed from the queue 122.

Hence, FIG. 9 and FIG. 10 further depict the computing device 102, based on a keyword and/or a response and/or a background noise, implementing, an electronic action configured to manage the queue 122 (e.g., the transfer of the call 108 to the PSAP 104-2 and/or a human-operated communication device 120 thereof, and/or the ending of the call 108 and the initiating of the public-safety related call 1001). Again the queue 122 is reduced due to the removal of the call 108, freeing processing resources and/or bandwidth at the computing device 102 to receive more calls 109.

It is further understood that the computing device 102 may implement a machine learning feedback loop to better train the call-taking engine 103 to provide electronic activities 134, for example by determining, based on output by the stress measurement engine 138, which electronic activities 134 cause increases or decreases in stress, and/or which order of a set of electronic activities 134 cause increases or decreases in stress, and the like. For example, as has already been described, during the call 108, the call-taking engine 103 may provide a plurality of electronic activities 134 in an order according to how the electronic activities 134 have been heuristically determined to reduce stress in callers, such as, in order, asking "54321" questions, asking math problems, asking to recite the alphabet and asking to make food. As has also been described, the stress measurement engine 138 may output indicators that indicate whether stress is increasing or decreasing, and such indicators may be further used to determine a rate of stress increasing or decreasing; for example, a rate of an increase or decrease of stress may be determined from a rate of change of the indicators output by the stress measurement engine 138.

Hence, indicators output by the stress measurement engine 138 may indicate when a first electronic activity 134 lowers stress by a greater or lower rate than a second electronic activity 134. Such indicators, converted to rates of change thereof (e.g. change of an indicator per second, change of an indicator per minute, amongst other possibilities) may be combined with respective activities 134 and provided to the call engine 103 as training data in a machine learning feedback loop to train the call engine 103 to provide given activities 134 in an order according to how the electronic activities 134 have been determined, according to rates of change of the indicators, to reduce stress in callers. Furthermore, when an order of a set of activities 134 is changed by the call-taking engine 103 due to such machine learning training, the computing device 102 may accordingly update a respective order of the set of activities 134 as stored at the memory 130.

Other training data may be used to train the call-taking engine 103 to better provide activities 134 and/or inquiries 124, such as whether a call 108, 109 ends while in the queue 122, and the like, when a given activity 134 or a given inquiry 124 is being provided, and/or a time period that a call 108, 109 is in the queue 122 before the call 108, 109 ends (e.g. without being transferred to a PSAP 104). For example, when a call 108, 109 ends while a given activity 134 or a given inquiry 124 is being provided, an indication of the call 108, 109 ending, as well as an indication of the given activity 134 or the given inquiry 124, may be provided as a negative training example (e.g. negative training data) to the call talking engine 103 in a machine learning feedback loop, which may cause of the given activity 134 or the given inquiry 124 to change and/or stop the call-taking engine 138 from providing the given activity 134 or the given inquiry 124. In some of these examples, an administrator of the system 100 may receive a notification (e.g. at human-operated communication device 110, 120) of the call 108, 109 ending and change or remove the given activity 134 or the given inquiry 124 accordingly. Conversely, when a call 108, 109 does not end while a given activity 134 or a given inquiry 124 is being provided, an indication of the call 108, 109 not ending, as well as an indication of the given activity 134 or the given inquiry 124, may be provided as a positive training example (e.g. positive training data) to the call talking engine 103 in a machine learning feedback loop, which may cause of the given activity 134 or the given inquiry 124 to change and/or stop the call-taking engine 138 from providing the given activity 134 or the given inquiry 124.

Similar training data may be generated and provided to the call-taking engine 103 in a machine learning feedback loop based on how long a call 108, 109 is in the queue 122 and an order of a set of activities 134 provided and the like, with longer relative times that a call 108, 109 is in the queue 122 indicating that the order of the set of activities 134 is "better" than shorter relative times that a call 108, 109 is in the queue 122. Hence, for example, when a first order of a set of activities 134 causes a call 108, 109 to be in the queue 122 longer than a second order of the set of activities 134, then such information may be provided to the call-taking engine 103 as training data in a machine learning feedback loop to cause the call-taking engine 103 to provide the set of activities 134 in the first order. For example, when an order of the activities 134 changes from a first order to a second order due to measured rates of change of stress, but such a such change of order leads to shorter times that calls 108, 109 are in the queue 122, the call-taking engine 103 may revert to the first order.

It is further understood that machine learning training and/or machine learning feedback loops as described herein may be performed on the basis of different call classification and/or call type. For example, as has already been described, based on keywords received on a call, different sets of activities 134 may be selected, and such keywords may further indicate a classification and/or type of such a call. Hence, for example, first machine learning training and/or first machine learning feedback loops as described herein may be performed on the basis of inquiries 124 and/or activities 134 provided on calls that include the keyword "depressed", and second machine learning training and/or second machine learning feedback loops as described herein may be performed on the basis of inquiries 124 and/or activities 134 provided on calls that include the keyword "self-harm". Put another way, calls may be classified into types according to keywords received in the calls, and machine learning training and/or machine learning feedback loops may be performed differently for different call classifications and/or types. Hence, for example, machine learning training data for calls that include the keyword "depressed" may be different from machine learning training data for calls that include the keyword "self-harm". As such, the call-taking engine 103 may be trained differently for different call classifications and/or types.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, operate machine learning algorithms, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, via a computing device, a call, the computing device configured to receive calls as a proxy for a public-safety answering point, the call received via a mental-health related number for the public-safety answering point;
   based on determining, via the computing device, that human-operated communication devices of the public-safety answering point are engaged on other calls: placing the call into a queue for answering by a human-operated communication device of the public-safety answering point; answering, via the computing device, the call; and providing, via the computing device, on the call, an inquiry for keywords indicative of mental health of a caller on the call;
determining, via the computing device, based on a keyword spoken by the caller on the call, an electronic activity configured to maintain the caller on the call and reduce stress levels of the caller, the electronic activity including a prompt to cause the caller to talk on the call;
providing, via the computing device, while the call is in the queue, the electronic activity on the call;
receiving, via the computing device, a response by the caller on the call; and
based on one or more of a relative reduction of the queue, the keyword, the response, and a measured stress level of the caller, implementing, via the computing device, an electronic action configured to manage the queue.

2. The method of claim 1, further comprising:
determining, via the computing device, based on the keyword: a priority tag for the call;
tagging, via the computing device, the call with the priority tag; and
comparing the priority tag to a threshold condition,
wherein based on the priority tag meeting the threshold condition the electronic action comprises one or more of:
escalating the call in the queue; and
transferring the call, from the queue, to an available human-operated communication device.

3. The method of claim 1, further comprising:
measuring, via the computing device, based on responses by the caller on the call, a stress level of the caller; and
adjusting, via the computing device, the electronic activity based on the measured stress level.

4. The method of claim 3, wherein the electronic activity is one electronic activity of a plurality of electronic activities, and the method further comprises:
based on the measured stress level of the caller increasing, providing, on the call, a first electronic activity of the electronic activities; or
based on the measured stress level of the caller decreasing, providing, on the call, a second electronic activity of the electronic activities.

5. The method of claim 3, wherein measuring the stress level of the caller comprises measuring intensity or relative intensity of frequencies of a voice of the caller on the call.

6. The method of claim 1, further comprising:
requesting permission, on the call, to place a public-safety related call; and
based on the permission being received on the call, and while the call is maintained by the computing device, initiating the public-safety related call.

7. The method of claim 1, further comprising:
monitoring, on the call, background noises different from a voice of the caller; and
based on the background noises meeting given criteria associated with the caller being in physical danger, and while the call is maintained by the computing device, initiating a public-safety related call.

8. The method of claim 7, wherein the background noises that meet the given criteria include a gunshot.

9. The method of claim 1, wherein the computing device implements a machine learning engine configured to determine the electronic activity from the keyword.

10. The method of claim 1, wherein the electronic activity is determined from the keyword using a database of keywords associated with electronic activities.

11. A device comprising:
a communication interface; and
a controller configured to:
receive, via the communication interface, a call, the controller configured to receive calls as a proxy for a public-safety answering point, the call received via a mental-health related number for the public-safety answering point;
based on determining that human-operated communication devices of the public-safety answering point are engaged on other calls; place the call into a queue for answering by a human-operated communication device of the public-safety answering point; answer the call; and provide, on the call, an inquiry for keywords indicative of mental health of a caller on the call;
determine, based on a keyword spoken by the caller on the call, an electronic activity configured to maintain the caller on the call and reduce stress levels of the caller, the electronic activity including a prompt to cause the caller to talk on the call;
provide, while the call is in the queue, the electronic activity on the call;
receive, via the communication interface, a response by the caller on the call; and
based on one or more of a relative reduction of the queue, the keyword, the response, and a measured stress level of the caller, implement an electronic action configured to manage the queue.

12. The device of claim 11, wherein the controller is further configured to:
determine, based on the keyword: a priority tag for the call;
tag the call with the priority tag; and
compare the priority tag to a threshold condition,
wherein based on the priority tag meeting the threshold condition the electronic action comprises one or more of:
escalating the call in the queue; and
transferring the call, from the queue, to an available human-operated communication device.

13. The device of claim 11, wherein the controller is further configured to:
measure, based on responses by the caller on the call, a stress level of the caller; and
adjust the electronic activity based on the measured stress level.

14. The device of claim 13, wherein the electronic activity is one electronic activity of a plurality of electronic activities, and the controller is further configured to:
based on the measured stress level of the caller increasing, provide, on the call, a first electronic activity of the electronic activities; or
based on the measured stress level of the caller decreasing, provide, on the call, a second electronic activity of the electronic activities.

15. The device of claim 13, wherein the controller is further configured to measure the stress level of the caller by measuring intensity or relative intensity of frequencies of a voice of the caller on the call.

16. The device of claim 11, wherein the controller is further configured to:
request permission, on the call, to place a public-safety related call; and
based on the permission being received on the call, and while the call is maintained by the device, initiate the public-safety related call.

17. The device of claim 11, wherein the controller is further configured to:
   monitor, on the call, background noises different from a voice of the caller; and
   based on the background noises meeting given criteria associated with the caller being in physical danger, and while the call is maintained by the device, initiate a public-safety related call.

18. The device of claim 17, wherein the background noises that meet the given criteria include a gunshot.

19. The device of claim 11, wherein the controller is further configured to implement a machine learning engine configured to determine the electronic activity from the keyword.

20. The device of claim 11, wherein the controller is further configured to determine the electronic activity from the keyword using a database of keywords associated with electronic activities.

* * * * *